US007024460B2

(12) United States Patent
Koopmas et al.

(10) Patent No.: US 7,024,460 B2
(45) Date of Patent: Apr. 4, 2006

(54) SERVICE-BASED COMPRESSION OF CONTENT WITHIN A NETWORK COMMUNICATION SYSTEM

(75) Inventors: Chris Koopmas, Menlo Park, CA (US); Constantine Polychronopoulos, Mountain View, CA (US); Nicholas Stavrakos, Palo Alto, CA (US)

(73) Assignee: Bytemobile, Inc., Mountain View, CA (US)

( * ) Notice: Subject to any disclaimer, the term of this patent is extended or adjusted under 35 U.S.C. 154(b) by 691 days.

(21) Appl. No.: 10/095,551

(22) Filed: Mar. 11, 2002

(65) Prior Publication Data

US 2003/0028606 A1 Feb. 6, 2003

Related U.S. Application Data

(60) Provisional application No. 60/309,218, filed on Jul. 31, 2001.

(51) Int. Cl.
*G06F 15/16* (2006.01)
(52) U.S. Cl. ....................... 709/206; 709/207; 709/247
(58) Field of Classification Search ..................... None
See application file for complete search history.

(56) References Cited

U.S. PATENT DOCUMENTS 5,557,749 A 9/1996 Norris .................. 395/200.18

(Continued)

FOREIGN PATENT DOCUMENTS

DE 199 29 232 12/2000

OTHER PUBLICATIONS

Wright, Gary R. and W. Richard Stevens. TCP/IP Illustrated, vol. 2: The Implementation. Reading, Mass.:Addison-Wesley, 1995. 995-1004.*

(Continued)

*Primary Examiner*—Jason Cardone
*Assistant Examiner*—Jeffrey R. Swearingen
(74) *Attorney, Agent, or Firm*—Wilson Sonsini Goodrich & Rosati

(57) ABSTRACT

A service module incorporated within the network infrastructure intercepts packets communicated between a client and a server to determine whether the connection corresponds to an email service. If so, the service module breaks the connection by terminating the connection with the client at the service module and opening a separate connection between the service module and the server. Packets communicated between the client and the server may then be redirected to an email compression application that monitors messages communicated between the client and the server and processes the messages in accordance with the state of the email session. For messages corresponding to connection establishment, user authentication and other protocol-specific messages, for example, the email compression application may be configured to forward the messages to the originally intended destination. Messages corresponding to an email message data, however, are buffered within the email compression application. Once the entire message has been received, the email compression application may strip the message headers and any protocol-specific data, compress the data and attach new message headers corresponding to the compressed email message. The compressed and reformatted email message is then reinserted into the data stream for transmission to the intended destination. Because compression may occur between the server and client, compression may be performed without requiring special processing by the server before email messages are sent. Furthermore, because the email messages may be compressed in a format that can be readily decompressed using decompression libraries incorporated within the operating system of client devices, such as the CAB format or GZIP format, the client may decompress received email messages utilizing software already incorporated within the operating system of the client device, without requiring download or installation of special decompression software and/or coordination of compression/decompression of email messages with the server or sending party.

22 Claims, 10 Drawing Sheets

U.S. PATENT DOCUMENTS

| | | | | |
|---|---|---|---|---|
| 6,032,197 A * | 2/2000 | Birdwell et al. | 709/247 |
| 6,112,250 A | 8/2000 | Appelman | 709/247 |
| 6,449,658 B1 * | 9/2002 | Lafe et al. | 709/247 |
| 6,785,712 B1 * | 8/2004 | Hogan et al. | 709/206 |
| 2003/0041110 A1 * | 2/2003 | Wenocur et al. | 709/206 |
| 2003/0053448 A1 | 3/2003 | Craig et al. | |

OTHER PUBLICATIONS

Mischel, Jim. Grab a CAB: CAB compression. Visual Developer Magazine, Sep./Oct. 1999. http://www.mischel-.com/pubs/grab_a_cab.htm.*

Stevens, W. Richard. TCP/IP Illustrated, vol. 1: The Protocols. Boston: Addison-Wesley, 1994. 441-459.*

Stallings, William. Cryptography and Network Security: Principles and Practice. New Jersey: Prentice Hall, 1999. 520-523.*

Matsui, Susumu, et al. Development of Communication Software for Mobile Computing, *Hitachi Review*, vol. 48, No. 4, 1999, pp. 246-249, XP002233033.

* cited by examiner

SERVICE-BASED COMPRESSION OF CONTENT WITHIN A NETWORK COMMUNICATION SYSTEM

REFERENCE TO RELATED APPLICATION

The present application claims priority from U.S. provisional application No. 60/309,218 filed Jul. 31, 2001. U.S. provisional application No. 60/309,218 is hereby incorporated herein by reference in its entirety.

BACKGROUND

1. Field of Invention

The present invention generally relates to network communication systems, and more particularly, to systems and methods for performing service-based compression of content within a network communication system.

2. Description of Related Art

The increasing deployment of Internet-based architectures, such as TCP/IP, within modern communication systems has exposed many of the limitations associated with a single, ubiquitous design. Because the Internet was initially intended to provide a free network in which stationary hosts predominately send unicast, reliable, sequenced, non-real-time data streams, the Internet was designed to be robust and minimalistic, with much of the functionality provided by the end hosts. The Internet, however, is increasingly required to support very diverse environments (heterogeneous wireline/wireless networks), applications (email, multimedia, WWW) and workloads (heterogeneous unicast and multicast streams with different quality of service requirements). The problem with supporting such diversity with a single network architecture is that different applications may have very different and potentially incompatible requirements.

Supporting applications that employ physical channels with significantly different signaling characteristics has proven especially problematic. In heterogeneous wireless/wireline networks, for example, the wireless channels are typically characterized by a relatively low bandwidth and a relatively high occurrence of random packet loss and deep fades. Because conventional Internet-based architectures typically assume that physical channels have a relatively high bandwidth and a relatively low occurrence of random packet loss, these architectures may erroneously conclude that packet loss was caused by congestion, rather than a temporary degradation in the signal quality of the wireless channel. For systems employing a TCP/IP architecture, this erroneous detection of congestion loss may cause the server to significantly decrease the rate at which data is transmitted to the wireless client, resulting in under-utilization of the limited bandwidth resources of the wireless channel. As a result, heterogeneous wireless/wireline networks typically exhibit sub-optimal performance and typically provide inefficient or ineffective use of limited wireless bandwidth resources.

These problems have become increasingly apparent with the increased popularity of wireless transmission of email messages, which often include large and uncompressed attachments. The transmission of large uncompressed files over a low bandwidth wireless channel not only results in an inefficient use of limited resources, but also increases the probability of random packet loss (and associated throttling of transmission rates) during transmission of the email message. Although many of these problems could be alleviated if users would compress email attachments before they are sent, most users are either unwilling or unable to do so. Many users may also be reluctant to compress email attachments because the user may be uncertain as to whether the recipient will have the appropriate software to decompress the attachments. Consequently, most email messages are transmitted over a wireless channel in an uncompressed format, which results in an inefficient use of wireless bandwidth, an increased probability of error or random packet loss during transmission and potentially significant download times.

Therefore, in light of deficiencies of existing network architectures, there is a need for improved systems and methods for performing service-based compression of content, such as email messages, within a network communications system. There also is a need to provide such systems and methods in a manner transparent to the client and server so as to avoid requiring the server to perform special processing on the content before the content is transmitted to the client and to avoid requiring the client to install and configure special decompression software to support the service-based compression.

SUMMARY OF THE INVENTION

Embodiments of the present invention provide systems and methods for reducing the amount of data communicated over a wireless (or other low bandwidth) channel by compressing content based on the type of requested service. In one embodiment of the present invention, a service module intercepts packets communicated between a client and a server and selectively processes packets corresponding to email services. For example, the service module may be configured to classify a connection between the client and the server to determine whether the connection corresponds to an email service, such as Post Office Protocol (POP) or Internet Message Access Protocol (IMAP). This process may involve examining the packet headers of incoming packets and comparing the destination port field with a predetermined set of destination port numbers, such as 110 (the designated port assignment for the POP email protocol) and 143 (the designated port assignment for the IMAP email protocol). If a connection between the client and the server corresponds to an email service, the service module breaks the connection between the client and the server by terminating the connection with the client at the service module and opening a separate connection between the service module and the server. This process breaks the end-to-end connection between the client and the server to form two separate connections: a client-side connection between the client and the service module and a server-side connection between the service module and the server.

Once the client-side connection and the server-side connection have been established, the service module may be configured to intercept subsequent packets addressed between the client and the server and redirect the packets via the client-side connection and the server-side connection to an email compression application associated with the service module. For example, the service module may be configured to modify the packet headers of incoming packets to replace the original destination address and destination port with a destination address and destination port associated with the email compression application. Packets addressed from the client may then be redirected to the email compression application via the client-side connection, and packets addressed from the server may be similarly redirected to the email compression application via the server-side connection. In an alternative embodiment, the service module may be configured to generate connection control parameters, such as TCP control block parameters, for the client-side connection and the server-side connection in response to the service module determining that the connection between the client and the server corresponds to an email service. These connection control parameters store the original source and destination information associated with the end-to-end connection (along with a redirected destination address and destination port associated with the email compression application) and enable the operating system and networking stack of the service module to recognize packets corresponding to the end-to-end connection and redirect packets to the email compression application.

Because the packets communicated between the client and the server may be redirected to the email compression application via client-side connection and the server-side connection, the email compression application may examine messages communicated between the client and the server and process the messages in accordance with the state of the email session. For example, the email compression application may be configured to forward messages corresponding to connection establishment, user authentication or other non-transaction related commands to the originally intended destination by reading the message from the client-side connection and writing the message to the server-side connection or vice versa. On the other hand, if the email session enters a transaction state, messages corresponding to email message data may be buffered within the email compression application. Because the email message data is received via a separate connection between the service module and the source, the service module sends acknowledgement packets back to the source in response to each received packet so that the source will continue to send data corresponding to the email message. Once the entire email message is received, the email compression application strips the message headers and any protocol-specific data, compresses the data and attaches new message headers corresponding to the compressed email message. The compressed and reformatted email message is then reinserted into the data stream for transmission to the originally intended destination.

For write operations performed on the client-side connection and the server-side connection, the operating system and networking stack of the service module may treat the outgoing data as though the data originated from the email compression application. As a result, the operating system and networking stack may generate packets having a source address and source port associated with the email compression application. In order to ensure that outgoing packets are properly recognized and processed by the original source and the original destination, the service module may be configured to generate outgoing packets using the network addresses and ports associated with the end-to-end connection. For example, the service module may be configured to maintain a table (or linked list structure) that stores the original packet header information associated with the client-side connection and the server-side connection. For outgoing packets sent through the client-side connection, the service module searches the table based on the information included in the packet header of the outgoing packet to determine the original packet header information associated with the client-side connection. The service module then modifies the outgoing packet to replace the source address and source port with the original network address and port associated with the server. Similarly, for outgoing packets sent through the server-side connection, the service module searches the table based on the information included in the packet header of the outgoing packet to determine the original packet header information associated with the server-side connection. The service module then modifies the outgoing packet to replace the source address and source port with the original network address and port associated with the client.

In an alternative embodiment, the service module may be configured to generate connection control parameters, such as TCP control block parameters, for the client-side connection and the server-side connection that incorporate the original network address and port associated with the end-to-end connection. The connection control parameters may then be used by the operating system and networking stack of the service module to generate outgoing packets having a network address and port corresponding to the original end-to-end connection between the client and the server. For example, the connection control parameters for the client-side connection may be configured to store the original source and destination addresses and the original source and destination ports associated with the client and server. When data is communicated to the client via the client-side connection, the service module uses the connection control parameters to generate outgoing packets having a source address and source port associated with the server. The connection control parameters associated with the server-side connection may be similarly configured such that the operating system and network stack of the service module automatically generates outgoing packets addressed to the server using the original source address and source port associated with the client. Because packets transmitted from the service module include the original source and destination addresses and the original source and destination ports associated with the end-to-end connection, the client and the server are unaware that the service module intercepted the packets and (possibly) performed intermediate processing on the transmitted data.

In another embodiment of the present invention, the email compression application may be configured to compress email messages in a format that can be readily decompressed using decompression libraries already incorporated within the operating system of the client device, such as the Microsoft Cabinet (CAB) format incorporated in the Microsoft Windows 95, 98, CE and NT operating systems and the GZIP format incorporated in the Unix operating system. This aspect of the present invention exploits the fact that most operating systems already support and recognize certain file formats and compression types in a default configuration. The CAB format, for example, is incorporated within the Microsoft Windows 95, 98, CE and NT operating systems to support decompression of backup system configuration files in the event of a system malfunction and decompression of operating system and user software files during initial installation and setup operations. As a result, files compressed in a CAB format using a recognized compression type, such as MSZip (default), Quantum or LZX, are automatically recognized and decompressed by the operating system in response to a user attempting to open a file having the associated ".cab" extension. By configuring the email compression application to compress email messages using a compression type supported by the CAB format, the GZIP format or another format natively supported by the client's operating system, the client may then decompress received email messages utilizing software already incorporated within the operating system of the client device, without requiring download or installation of special decompression modules and/or coordination of compression/decompression of email messages with the server or sending party. Furthermore, the email compression application may also change the file extensions associated with compressed email attachments so that the client's operating system will automatically recognize and decompress the attachment (by executing the decompression module associated with the applicable file extension) in response to the user attempting to open the email attachment. As a result, the service module may be configured to provide a transparent end-to-end email compression service without requiring installation of special software modules at the client (other than modules already incorporated in the operating system of the client device).

In yet another embodiment of the present invention, the service module may be configured to select between a first compression mode and a second compression mode based on a determination of whether the client includes a compatible decompression unit. In the first compression mode, the service module performs socket compression on data transmitted to the client. In the second compression mode, the service module forwards uncompressed messages corresponding to signaling messages, such as connection establishment, user authentication or other connection control commands, and compresses data corresponding to an email message. In operation, the service module may be configured to classify a connection to determine whether the source address associated with a source matches a predetermined source address or falls within a predetermined range of source addresses (which may comprise the source addresses of registered users of a peer decompression unit or registered client modules of a network carrier that incorporate a peer decompression unit). If so, the service module performs socket compression on data communicated on the downlink from the service module to the source. If the source address associated with the source does not match the predetermined source address or predetermined range of source addresses, the service module processes email messages using the second compression mode.

In still another embodiment, the email compression application may be configured to selectively compress email messages in accordance with the type of content. For example, the email compression application may associate each type of content supported by an email protocol, such as text, application, audio, video or application data, with a corresponding compression type, such as lossless compression, lossy compression or no compression. The association between the compression type and the type of content may be stored in a configuration file that may be modified to register new types of content or change an existing association without requiring the email compression application to be recompiled. The configuration file may also associate each compression type with a compression format, such as a CAB format, a GZIP format or no compression, in order to enable a user to modify the compression format without modifying the association between the compression type and the type of content. For messages having multiple parts (e.g., attachments) or embedded messages (e.g., forwarded messages), the email compression application may be configured to extract each part of the email message and individually process each part in accordance with the type of content. Once each part of the message has been compressed, the email compression application may then attach new message headers to each part (corresponding to the compressed and reformatted data) and reassemble the individual parts in the same order as the original uncompressed message. Because each part of the message may be individually processed, the email compression application may be configured to selectively compress email attachments and forward the email message body in an uncompressed format. This process also enables the client's email application to recognize each compressed part by examining the associated uncompressed message headers.

BRIEF DESCRIPTION OF THE DRAWINGS

These and other features and advantages of the present invention will become more apparent to those skilled in the art from the following detailed description in conjunction with the appended drawings in which.

DETAILED DESCRIPTION

Aspects of the present invention provide systems and methods for performing service-based compression of content, such as email messages within a communications network. The following description is presented to enable a person skilled in the art to make and use the invention. Descriptions of specific applications are provided only as examples. Various modifications, substitutions and variations of the preferred embodiment will be readily apparent to those skilled in the art, and the generic principles defined herein may be applied to other embodiments and applications without departing from the spirit and scope of the invention. Thus, the present invention is not intended to be limited to the described or illustrated embodiments, and should be accorded the widest scope consistent with the principles and features disclosed herein.

Figure 1A:
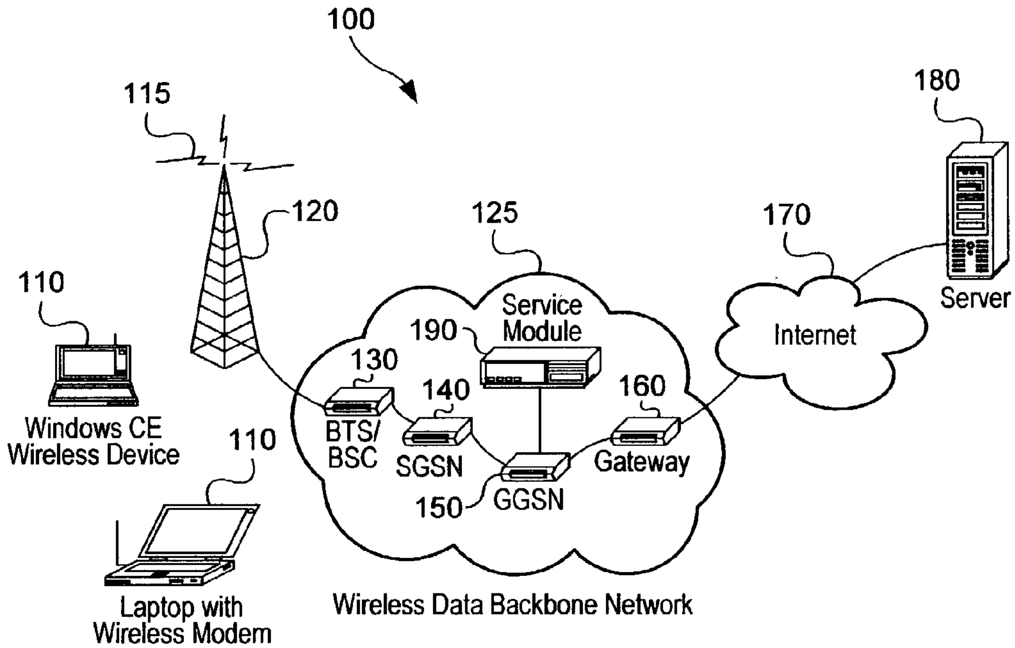
FIGS. 1A and 1B illustrate exemplary network communication systems in which the principles of the present invention may be advantageously practiced.

Referring to FIG. 1A, an exemplary network communication system in which the principles of the present invention may be advantageously practiced is depicted generally at 100. The exemplary system includes a wireless client 110, such as a personal digital assistant or laptop computer equipped with a wireless modem, that communicates with a server 180 via a wireless backbone network 125 and the Internet 170. In this exemplary system, the wireless backbone network 125 employs a General Packet Radio Service (GPRS) architecture. Accordingly, in order to communicate with the server 180 on the uplink, the wireless client 110 communicates with a base station 120 located within the wireless client's assigned cell. The base station 120 then forwards data and signaling information received from the wireless client 110 through the wireless backbone network 125 via a base transceiver station 130, a serving GPRS support node (SGSN) 140, a gateway GPRS support node (GGSN) 150 and a gateway 160. The gateway 160 acts as an interface between the wireless backbone network 125 and nodes within the Internet 170 and enables information to be transceived between wireless clients 110 coupled to the wireless backbone network 125 and servers 180 coupled to the Internet 170. On the downlink, information is routed through the Internet 170 and wireless backbone network 125 from the server 180 toward the wireless client 110. Once the information is received by the base station 120, the information is transmitted to the wireless client 110 over a wireless channel 115.

One problem commonly associated with communication networks incorporating a wireless channel, such as the exemplary wireless network illustrated in FIG. 1A, is that these networks tend to exhibit sub-optimal performance due to the mismatch in signaling characteristics between the wireless channel 115 and the wireline portions of the wireless backbone network 125 and Internet 170. A wireless channel 115, for example, is typically characterized by a relatively low bandwidth and a relatively high occurrence of random packet loss and deep fades. These random packet losses and periods in which the wireless client 110 is unavailable may be erroneously interpreted by the network as congestion loss (rather than a mere temporary degradation in the signaling quality of the wireless channel 115). For networks implementing a TCP/IP architecture, this erroneous detection of congestion loss may cause the server 180 to significantly reduce the transmission rate of information sent to the wireless client 110, resulting in under-utilization of limited bandwidth resources of the wireless channel 115.

The wireless transmission of email messages having large and uncompressed attachments further exacerbates these problems in that transmission of large uncompressed files over a low bandwidth wireless channel 115 not only results in an inefficient use of limited resources, but also increases the probability of random packet loss (and associated throttling of transmission rates) during transmission of the email message. Although many of these problems could be alleviated if users would compress email attachments before they are sent, most users are either unwilling or unable to do so. Many users may also be reluctant to compress email attachments because the user may be uncertain as to whether the recipient will have the appropriate software to decompress the attachments. Consequently, most email messages and email attachments are transmitted over a wireless channel in an uncompressed format, which results in an inefficient use of wireless bandwidth, an increased probability of error or random packet loss during transmission and potentially significant download times.

Figure 1B:
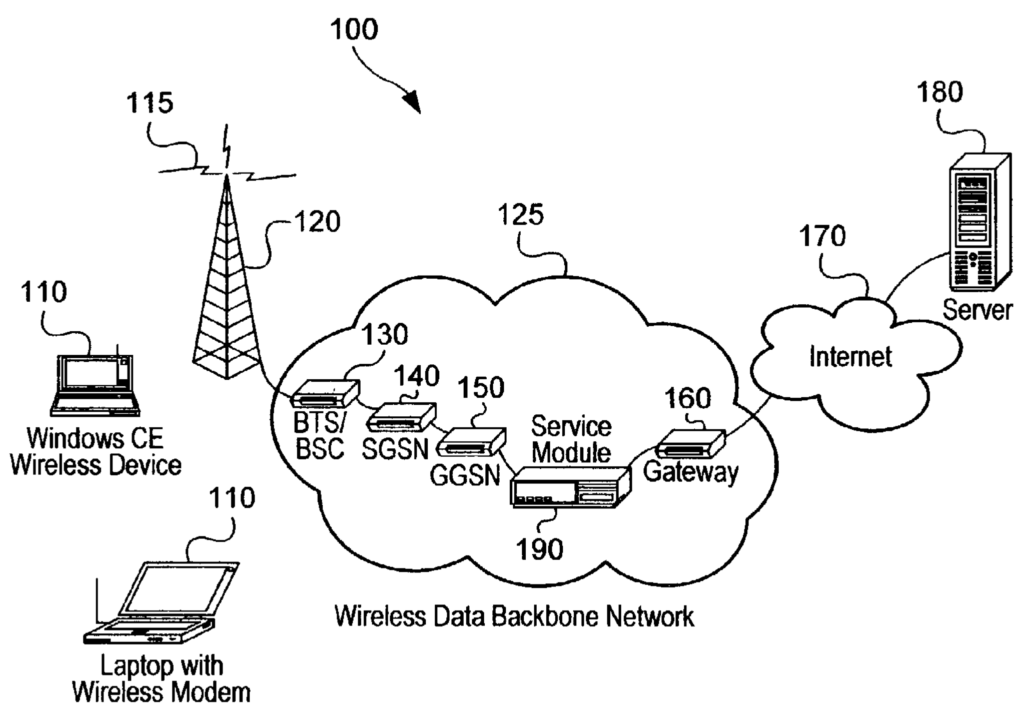

Aspects of the present invention alleviate many of the foregoing problems by utilizing a service module 190 for compressing email messages communicated over a wireless (or other low bandwidth) channel. The service module 190 may be incorporated within the network infrastructure between the wireless client 110 and server 180 in order to enable the service module 190 to process email messages as the corresponding packets flow through the network. As illustrated in FIG. 1A, for example, the service module 190 may be deployed in an offload configuration that enables the service module 190 to process packets forwarded from a network node, such as a GGSN 150. The configuration of FIG. 1A may be advantageous in that it enables the service module 190 to conform to less stringent reliability requirements, and allows the service module 190 to be periodically taken off-line for hardware or software upgrades or periodic maintenance without disabling links between adjacent nodes. In an alternative embodiment illustrated in FIG. 1B, the service module 190 may be arranged in an inline configuration between network nodes such that packets are routed through the service module 190. This inline configuration may also be advantageous in that it may minimize packet processing delays by enabling the service module 190 to process packets without traversing through an intermediate network node. Other embodiments may directly incorporate functionalities of the service module 190 within a network node, such as a GGSN 150, SGSN 140, gateway 160, base transceiver station 130 or the like, in order to enhance the processing capabilities of conventional network nodes or reduce the overhead associated with maintaining separate pieces of equipment.

The service module 190 may be configured to reduce the amount of data transmitted over a wireless channel 115 by intercepting packets communicated between the server 180 and the wireless client 110 and selectively processing packets corresponding to email services. For example, the service module 190 may be configured to classify a connection between the wireless client 110 and the server 180 to determine whether the connection corresponds to an email service, such as Post Office Protocol (POP) or Internet Message Access Protocol (IMAP). This process may involve examining packet headers and comparing the destination port field with a predetermined set of destination port numbers, such as 110 (the designated port assignment for the POP email protocol) and 143 (the designated port assignment for the IMAP email protocol). If a connection between the wireless client 110 and the server 180 corresponds to an email service, the service module 190 breaks the connection between the wireless client 110 and the server 180 by terminating the connection with the wireless client 110 at the service module 190 and opening a separate connection between the service module 190 and the server 180. This process breaks the end-to-end connection between the wireless client 110 and the server 180 to form two separate connections: a client-side connection between the wireless client 110 and the service module 190 and a server-side connection between the service module 190 and the server 180. Packets communicated between the wireless client 110 and the server 180 are then redirected through the client-side connection and the server-side connection to an email compression application associated with the service module 190 that examines messages communicated between the wireless client 110 and the server 180 and processes the messages in accordance with the state of the email session.

For packets communicated on the uplink from the wireless client 110 to the server 180, the service module 190 may be configured in one embodiment to redirect the packets to the email compression application by replacing the original destination address and destination port associated with the server 180 with a destination address and destination port associated with the email compression application. This redirection process enables incoming packets to be treated by the operating system and networking stack of the service module 190 as though the packets were terminated at the email compression application. In an alternative embodiment, the service module 190 may be configured to generate connection control parameters, such as TCP control block parameters, for the client-side connection that stores the original source and destination information associated with the end-to-end connection (along with the redirected address and port associated with the email compression application)

in response to the service module detecting that the connection corresponds to an email service. These connection control parameters may then be used by the operating system and networking stack of the service module 190 to recognize and redirect subsequent packets communicated between the wireless client 110 and the server 180 to the email compression application.

Once the incoming data is passed to the email compression application, the email compression application may then examine the data communicated from the wireless client 110 to the server 180, update the state of the email session, and forward the data to the server 180 by writing the data to the server-side connection. The data then flows through the operating system and networking stack of the service module 190 to generate an outgoing packet addressed to the server 180. Because the operating system and networking stack of the service module 180 may treat the packet as though the packet originated at the email compression application, the outgoing packet may have source address and source port fields associated with the email compression application. In order to ensure that outgoing packets are properly received and processed by the server 180 (which may be a problem in the event the server 180 is behind a firewall that limits access to particular source addresses or to source addresses within a particular range), the service module 190 may be configured in one embodiment to modify the packet header of outgoing packets to replace the source address and source port associated with the email compression application with the original source address and source port associated with the end-to-end connection. For example, the service module 190 may be configured to maintain a lookup table (or linked-list structure) that stores the original packet header information initially received from the wireless client 110 before the packet header information is modified during the redirection process. The service module 190 may then search the lookup table to determine the original source address and source port and modify the packet header of the outgoing packet to replace the source address and source port associated with the email compression application with the source address and source port associated with the wireless client 110. In an alternative embodiment, the service module 190 may be configured to maintain connection control parameters, such as TCP control block parameters, for the server-side connection that incorporate the original network address and port associated with the wireless client 110. The connection control parameters may then be used by the operating system and networking stack of the service module 190 to automatically generate outgoing packets addressed to the server 180 using the original source address and source port associated with the wireless client 110. Because the outgoing packets received by the server 180 have a source address and source port associated the wireless client 110, the server 180 does not and cannot know that the service module 190 has broken the end-to-end connection and (possibly) performed intermediate processing on the transmitted data. As a result, the server 180 treats the connection as though the connection was between the server 180 and the wireless client 110.

For packets communicated on the downlink from the server 180 to the wireless client 110, the service module 190 may similarly redirect the incoming packets through the server-side connection by either replacing the destination address and destination port associated with the wireless client 110 with the destination address and destination port associated the email compression application, or maintaining connection control parameters for the server-side connection that enables the operating system and networking stack of the service module 190 to recognize and redirect packets associated with the end-to-end connection to the email compression application. The email compression application may then examine the data communicated from the server 180 to the wireless client 110, update the state of the email session, and process the data in accordance with the state of the email session. For example, if the data received from the server 180 corresponds to connection establishment, user authentication or other non-transaction related messages, the email compression application forwards the messages to the wireless client 110 by writing the data to the client-side connection. On the other hand, if the email session enters a transaction state, the data corresponding to the email message data is buffered within the email compression application. Because these data packets are received on a separate server-side connection, the operating system and networking stack automatically sends "fake" acknowledgement packets back to the server 180 in response to each received packet so that the server 180 will continue to send data corresponding to the email message. Once the entire email message is received, the email compression application strips the message headers and any protocol-specific data, compresses the data and attaches new message headers corresponding to the compressed email message. The compressed and reformatted email message is then written to the client-side connection for transmission to the wireless client 110.

In order to maintain a transparent end-to-end connection, the service module 190 also performs a reverse-redirection process on outgoing packets communicated to the wireless client 110 through the client-side connection. In other words, the service module 190 may be configured in one embodiment to perform a search of the lookup table to determine the original network address and port assignment associated with the server 180. The service module 190 may then modify the packet headers of outgoing packets transmitted to the wireless client 110 to replace the source address and source port associated with the email compression application with the original network address and port associated with the server 180. In an alternative embodiment, the service module 190 may be configured to maintain connection control parameters for the client-side connection that stores the original source and destination information associated with the end-to-end connection and enables the operating system and networking stack of the service module 190 to generate outgoing packets communicated to the wireless client 110 using a source address and source port associated with the server 180. Because the outgoing packets received by the wireless client 110 include a source address and source port associated with the server 180, the wireless client 110 is similarly unaware that the service module 110 has broken the end-to-end connection. As a result, the wireless client 110 also treats the connection as though the connection was between the wireless client 110 and the server 180.

By incorporating the service module 190 within the network between the wireless client 110 and server 180, compression of email messages may be performed without requiring special processing by the server 180 (or hosts coupled to the network side of the server 180) before the email messages are sent. Furthermore, the email compression application may be configured to compress the email messages in a format that can be readily decompressed using decompression libraries already incorporated within the operating system of the wireless device, such as the Microsoft Cabinet (CAB) format incorporated in the Microsoft Windows 95, 98, CE and NT operating systems and the GZIP format incorporated in the Unix operating system. This aspect of the present invention exploits the fact that most operating systems already support and recognize certain file formats and compression types in a default configuration. The CAB format, for example, is incorporated within the Microsoft Windows 95, 98, CE and NT operating systems to support decompression of files during installation and setup operations and to decompress backup registration files in the event of a system malfunction. Files compressed in a CAB format using a recognized compression type, such as MSZip (default), Quantum or LZX, are automatically recognized and decompressed by the operating system in response to a user attempting to open a file having the associated ".cab" extension. By configuring the email compression application to compress email messages using a compression type supported by the CAB format, the GZIP format or another format natively supported by the wireless client's operating system, the wireless client 110 may decompress received email messages utilizing software already incorporated within the operating system of the wireless device, without requiring download or installation of special decompression modules and/or coordination of compression/decompression of email messages with the server 180 or sending party. Notably, the email compression application may also change the file extensions associated with compressed email attachments so that the wireless client's operating system will automatically recognize and decompress the attachment (by executing the decompression module associated with the applicable file extension) in response to the user attempting to open the email attachment. As a result, the service module 190 may be configured to provide a transparent end-to-end email compression service without requiring special processing by the server 180 or installation of special software modules at the wireless client 110 (other than modules already incorporated in the operating system of the wireless device).

Figure 2:
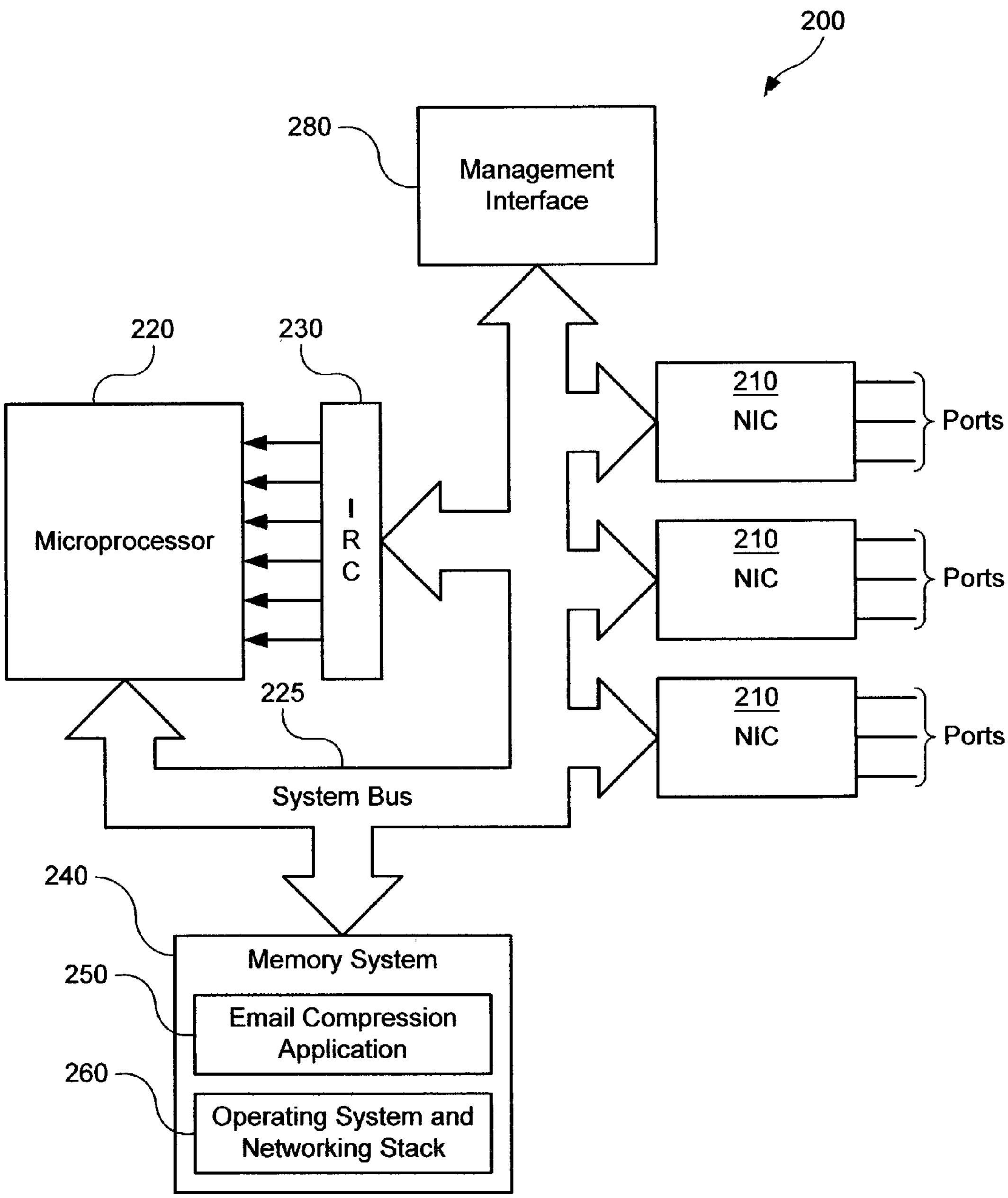
FIG. 2 illustrates an exemplary service module platform that may be used in accordance with the present invention.

Referring to FIG. 2, an exemplary service module platform that may be used in accordance with the present invention is depicted generally at 200. As illustrated, the exemplary platform includes one or more network interface cards 210 for interfacing with other nodes within the network, such as a base transceiver station, a SGSN, a GGSN, a gateway or the like. The network interface cards 210 are coupled to a processor 220 via a system bus 225. The processor 220 is also coupled to a memory system 240, such as a random access memory, a hard drive, a floppy disk, a compact disk, or other computer readable medium, which stores an operating system and networking stack 260 and an email compression application 250. The exemplary platform may also include a management interface 280, such as a keyboard, input device or port for receiving configuration information, that may be used to selectively modify configuration parameters within the operating system and networking stack 260 and the email compression application 250 without requiring the modules to be re-compiled.

In operation, the network interface cards 210 generate a system interrupt to the interrupt controller 230 in response to the network interface card 210 receiving a packet. The interrupt controller 230 then passes the interrupt to the processor 220 in accordance with the interrupt's assigned priority. Once the interrupt is received by the processor, the interrupt causes the processor 220 to execute interrupt handlers incorporated within the operating system and networking stack 260 to process the received packet. These modules may provide operating system functions and other functions associated with the applicable protocol, such as TCP/IP or UDP/IP. Embodiments of the present invention may also incorporate other functionalities within the operating system and networking stack 260, such as functionalities for classifying the connection, breaking the connection between the wireless client and the server, and generating source addresses for outgoing packets. In other embodiments of the present invention, the operating system and networking stack 260 may also interact with the email compression application 250 to provide email compression services.

Figure 3A:
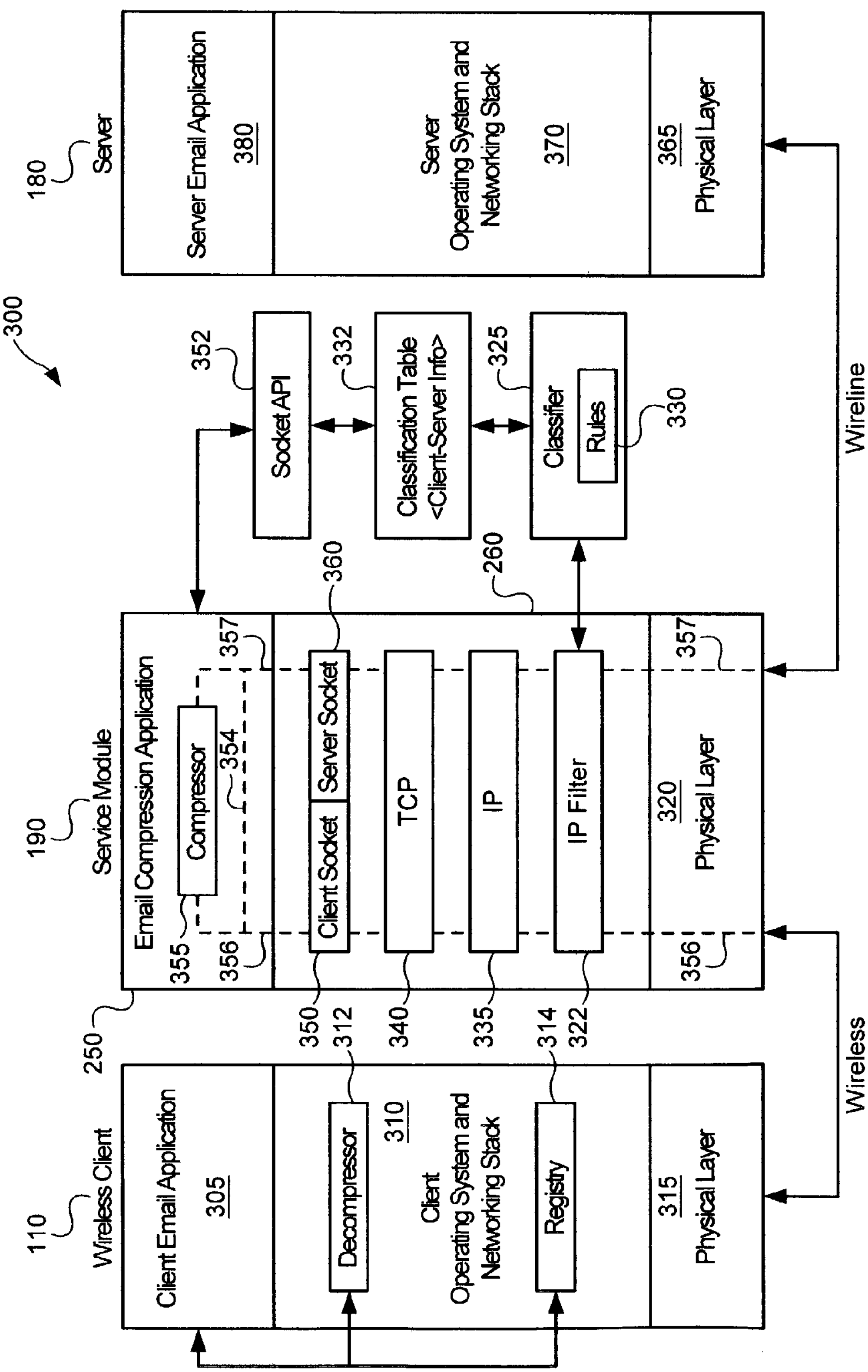
FIGS. 3A and 3B illustrate functional block diagrams of an exemplary email compression system in accordance with a first and a second embodiment of the present invention.

Referring to FIG. 3A, a functional block diagram of an exemplary email compression system in accordance with one embodiment of the present invention is illustrated generally at 300. The exemplary system includes a service module 190 having a physical layer 320, an operating system and networking stack 260 and an email compression application 250. As packets are received by the physical layer 320, the physical layer 320 initiates a interrupt to the operating system and networking stack 260 to process the received packet. An IP filter layer 322 within the operating system and networking stack 260 then initiates a classifier 325 to classify the received packet in accordance with a set of classification rules 330 to determine whether the packet corresponds to an email service supported by the service module 190. These classification rules 330 may comprise one or more masks that are applied to the packet header. For example, in order to determine whether a received packet corresponds to an email service, the classification rules 330 may mask the source address, source port, destination address, and device (or VLAN) ID fields within the packet header and determine whether the protocol field equals TCP and whether the destination port equals either 110 (for POP email protocol) or 143 (for IMAP email protocol). If the packet does not match a classification rule 330, the classifier 325 either drops the packet or returns the packet to the IP filter layer 322 without modification. If the packet corresponds to an email service supported by the service module 190, however, the classifier 325 redirects the packet to the email compression application 250 by modifying the packet header to replace the original destination address and destination port with a destination address and destination port associated with the email compression application 250. The classifier 325 then returns the modified packet to the IP filter layer 322, which forwards the modified packet to the IP and TCP layers 335, 340 for processing. The classifier 325 also stores the original packet header information (along with the redirected destination address and destination port) within a classification table 332 to enable the classifier 325 and the email compression application 250 to access the original packet header information at a later time, as will be described hereinbelow.

Because the modified packet header includes a destination address and destination port associated with the email compression application 250, the IP and TCP layers 335, 340 process the modified packet as though the packet were terminated at the email compression application 250. As a result, the IP and TCP layers 335, 340 unpack the modified packet and pass the packet data to the operating system and networking stack 260. For packets corresponding to a new connection from a new source (typically the wireless client 110), the operating system and networking stack 260 forwards the packet data to a client socket 350 that the email compression application 250 previously established to receive new connections. The operating system and networking stack 260 also sets a flag to inform the email compression application 250 that a new connection has been requested. Once the email compression application 250 accepts the new connection, subsequent packets from the same source to the same destination are forwarded by the operating system and networking stack 260 to that client socket 350. In other words, as subsequent packets from the same source to the same destination flow through the classifier 325, the classifier 325 redirects the packets to the email compression application 250. The IP and TCP layers 335, 340 then process the redirected packets based on the source and modified destination information, and the operating system and networking stack 260 passes the data to the client socket 350. The email compression application 250 may then access data communicated from the source by performing a read operation on the client socket 350 and send data to the source by performing a write operation on the client socket 350.

In order to provide a connection to the original destination (typically the server 180), the email compression application 250 initiates a socket API 352 that searches the classification table 332 based on the source address and redirected destination address associated with the client socket 350. This search of the classification table 332 enables the email compression application 250 to recover the original packet header information before the destination information was modified by the classifier 325 during the redirection process. Once the email compression application 250 retrieves the original packet header information, the email compression application 250 may then open a server socket 360 using the original destination address and destination port. This process opens a separate connection between the email compression application 250 and the original destination to enable data to be communicated between the destination and the email compression application 250. The email compression application 250 also initiates another call to the socket API 352 to create a new entry within the classification table 332 that stores the original packet header information (that was retrieved by email compression application 250), along with the redirected destination address and destination port associated with the server socket 360. Once the server socket 360 is established, the email compression application 250 may then receive data from the destination by performing a read operation on the server socket 360 and send data to the destination by performing a write operation on the server socket 360.

For write operations performed on the client socket 350 and the server socket 360, the corresponding data flows through the TCP and IP layers 340, 335 as though the data originated from the email compression application 250. As a result, the TCP and IP layers 340, 335 may generate packets having a source address and source port associated with the email compression application 250. In order to ensure that the packets are properly recognized and processed by the original source and the original destination (which may be a problem in the event the source and/or destination are behind a firewall that limits access to particular source addresses or a particular range of source addresses), the IP filter layer 322 initiates a call to the classifier 325 to modify outgoing packets to replace the source address and source port with the original source address and source port associated with the end-to-end connection. For packets addressed from the client socket 350, for example, the classifier 325 searches the classification table 332 based on the information included in the packet header of the outgoing packet to determine the original packet header information associated with the client socket 350. The classifier 325 then modifies the outgoing packet to replace the source address and source port with the original network address and port associated with the destination and returns the modified packet to the IP filter layer 322 such that the outgoing packet to the source appears to originate from the destination. For outgoing packets addressed from the server socket 350, the classifier 325 similarly searches the classification table 332 for the original packet header information associated with the server socket 360 (that was stored by email compression application 250) and modifies the packet header of the outgoing packet by replacing the source address and source port fields with the original network address and port associated with the source such that the outgoing packet to the destination appears to originate from the source. Accordingly, because packets transmitted from the service module 190 include the original source and destination addresses and original source and destination ports, the original source and the original destination are unaware that the service module 190 intercepted the packets and (possibly) performed intermediate processing on the transmitted data.

Once the client socket 350 and server socket 360 have been established and the connection information associated with each socket has been stored in the classification table 332, the classifier 325 may then classify subsequent packets by searching the classification table 332 to determine whether the packets correspond to an on-going connection. If the packet header of an incoming packet matches an entry stored in the classification table 332, the classifier 325 may then access the redirected destination address and destination port stored in the classification table 332 and modify the destination address and destination port of the packet header as described above. If the incoming packet does not match an entry stored in the classification table 332, the classifier 325 may classify the packet in accordance with the classification rules 330 to determine whether to redirect the packet to the email compression application 250. By performing an initial search of the classification table 332, however, the classifier 325 may avoid the need to re-classify additional packets corresponding to an on-going connection (which may comprise the majority of packets forwarded to or through the service module 190).

During an exemplary email session, packets addressed from a client email application 305 to a server email application 380 flow through the client operating system and networking stack 310 and physical layer 315 of the wireless client 110 and across the wireless portion of the communications network. The communications network then forwards the packets to or through the service module 190 depending on whether the service module 190 is arranged in an inline or offload configuration. Once the service module 190 receives the incoming packets from the client email application 305, the IP filter layer 322 calls the classifier 325 to classify the received packets to determine whether the packets correspond to an email service by either searching the classification table 332 or classifying the packets in accordance with the classification rules 330. If the packets correspond to an email service, the classifier 325 terminates the connection with the client email application 305 at the email compression application 250 to form a client-side connection 356 between the email compression application 250 and the client email application 305. The email compression application 250 may then receive data from the client email application 305 by performing a read operation on the client-side connection 356 and send data to the client email application 305 by performing a write operation on the client-side connection 356.

Similarly, packets addressed from the server email application 380 to the client email application 305 flow through the server operating system and networking stack 370 and physical layer 365 of the server 180 and across the wireline portion of the communications network. Once the service module 190 receives the incoming packets from the server email application 380, the IP filter layer 322 calls the classifier 325 to classify the received packets to determine whether the packets correspond to an email service by either searching the classification table 332 or applying the classification rules 330. If the packets correspond to an email service, the classifier 325 redirects the packets to the email compression application 250 through a separate server-side connection 357 that the email compression application 250 opened in response to the initial packet received from the client email application 305. The email compression application 250 may then receive data from the server email application 380 by performing a read operation on the server-side connection 357 and send data to the server email application 380 by performing a write operation on the server-side connection 357.

For outgoing packets sent by the email compression application 250 through the client-side connection 356, the IP filter layer 322 calls the classifier 325 to search the classification table 332 and replace the source address and source port associated with the email compression application 250 with the network address and port associated with the server email application 380. The modified outgoing packets are then routed through the wireless portion of the communications network and are transmitted to the wireless client 110. Once the wireless client 110 receives the packets, the client operating system and networking stack 310 processes the packets as though the packets originated directly from the server email application 380 and passes the processed packets to the client email application 305. The classifier 325 similarly modifies outgoing packets sent by the email compression application 250 through the server-side connection 357 by replacing the source address and source port associated with the email compression application 250 with the network address and port assignment associated with the client email application 305. The outgoing packets are then routed to the server 180 through the wireline portion of the communications network. Once the server 180 receives the packets, the server operating system and networking stack 370 processes the packets as though the packets originated directly from the client email application 305 and passes the processed packets to the server email application 380.

Because the client-side connection 356 and the server-side connection 357 either terminate or originate at the email compression application 250, the email compression application 250 may monitor data received from the client-side connection 356 and the server-side connection 357 and process the data in accordance with the state of the email session. For example, the email compression application 250 may be configured to forward connection-related data, such as connection establishment and user authentication messages, between the client-side connection 356 and the server-side connection 357 by reading the data from the client-side connection 356 and writing the data to the server-side connection 357 and vice versa, as indicated generally by line 354. Alternatively, if the email compression application 250 detects initiation of an email message transaction, the email compression application 250 may buffer the corresponding email message data within a compressor 355 until the entire message has been received. Because these email message data packets are received through a separate connection, the TCP and IP layers 340, 335 automatically send acknowledgement messages back to the source of the data (typically the server 180) so that the source will continue to send data corresponding to the email message. Once the entire email message is received, the compressor 355 strips the message headers and any protocol-specific data, compresses the data and attaches new message headers corresponding to the compressed email message. The compressed and reformatted email message is then reinserted into the data stream by writing the compressed email message to the appropriate client-side connection 356 or server-side connection 357. By using the foregoing process, the service module 190 may be configured to intercept packets corresponding to email messages and provide an email compression service in a manner transparent to the wireless client 110 and the server 180.

Because many of the problems associated with wireless transmission of email messages occur during transmission of the email messages on the downlink toward the wireless (or other low bandwidth) channel, some embodiments of the present invention may configure the service module 190 to support only pull-type email services, such as POP or IMAP. These pull-type email services are generally initiated by clients for the purpose of downloading email messages. Because clients are the more likely end host to be connected to the communications network via the low bandwidth channel, these embodiments of the present invention may ensure that email messages are compressed and transmitted toward the low bandwidth channel.

In other embodiments of the present invention, the compressor 355 may be configured to compress email message data in a manner that can be readily decompressed by the wireless client 110. One of the problems generally associated with sending compressed email messages is ensuring that the recipient has the appropriate decompression software to decompress the email messages. Embodiments of the present invention alleviate these problems by exploiting the fact that most operating systems already recognize and support certain file formats and compression types in a default configuration. In other words, these operating systems incorporate decompression libraries to perform functions associated with operating system, such as decompression of backup system configuration files or decompression of operating system files or user software files during initial installation and setup operations. For example, Microsoft Windows 95r, 98, CE and NT operating systems natively support the CAB format and associated decompression libraries within Windows Explorer. As a result, files compressed in a CAB format using a recognized compression type, such as MSZip (default), Quantum or LZX, are automatically recognized and decompressed by the operating system in response to a user attempting to open a file having the associated ".cab" extension. As illustrated in FIG. 3A, the client operating system and networking stack 310 may incorporate a decompressor 312 for decompressing file formats, such as the CAB format or GZIP format. Preferably, the file extension associated with the decompressor 312 is registered within the registry 314 or other operating system configuration file when the client operating system and networking stack 310 is installed so that the client operating system and networking stack 310 will automatically execute the decompressor 312 in response to a user attempting to open a file having the associated file extension.

By configuring the compressor 355 to compress email messages using a compression type supported by the decompressor 312, the wireless client 110 can decompress received email messages utilizing software already incorporated within the client operating system and networking stack 310, without requiring download or installation of special decompression modules by the user and/or coordination of compression/decompression of email messages with the server 180 or sending party. The compressor 355 may also change the file extensions associated with compressed email attachments so that the client operating system and networking stack 310 will automatically recognize and decompress the attachment (by executing the decompressor 312 associated with the applicable file extension) in response to the user attempting to open the email attachment. By leveraging the decompressor 312 already incorporated in generally available and widely deployed client operating systems, the service module 190 may be configured to provide a transparent end-to-end email compression service without requiring installation or configuration of special decompression modules at the wireless client 110.

Figure 3B:
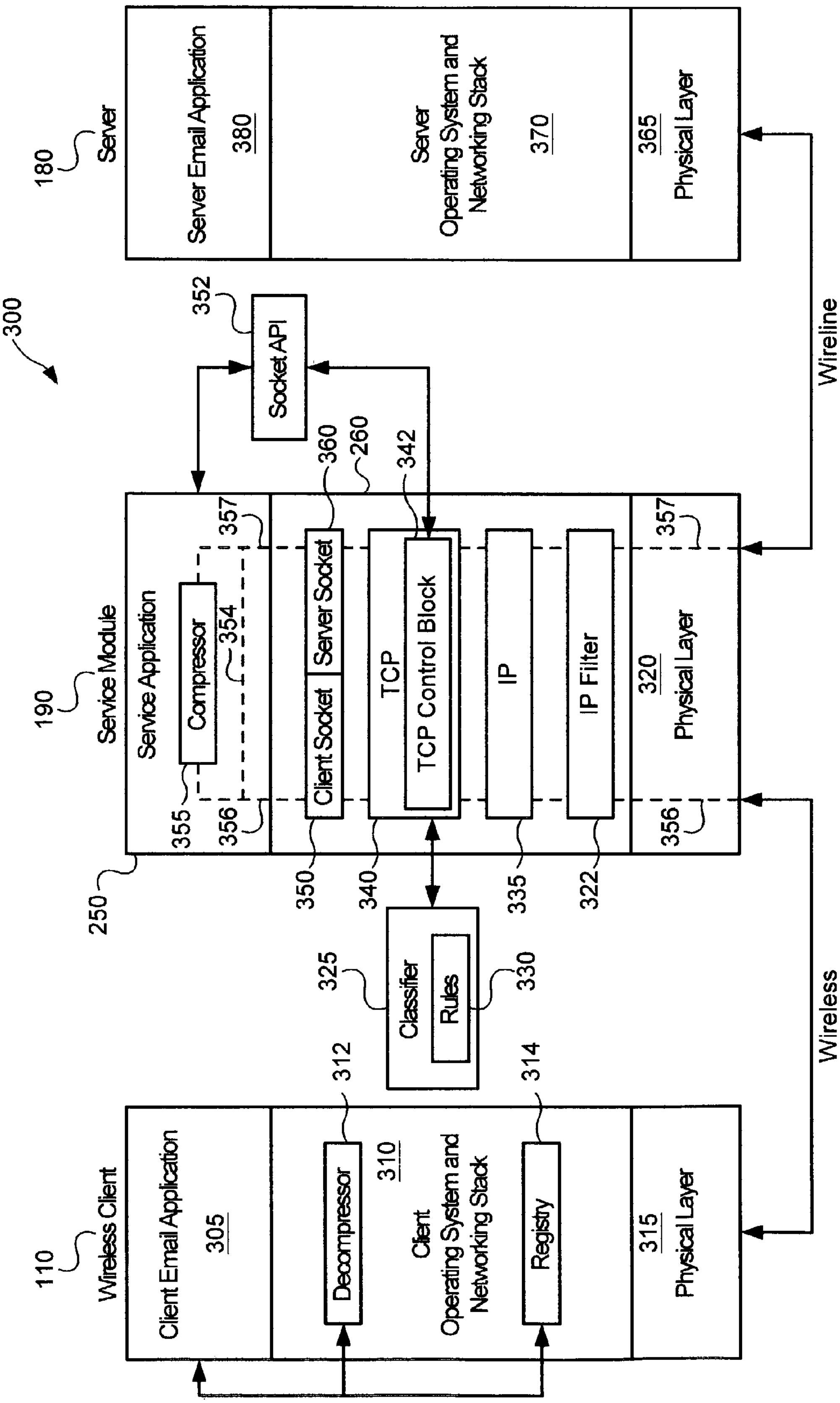

Referring to FIG. 3B, a functional block diagram of an exemplary email compression system in accordance with a second embodiment of the present invention is illustrated generally at 300. The embodiment of FIG. 3B is substantially similar to the embodiment of FIG. 3A and incorporates many of the principles discussed above. The embodiment of FIG. 3B, however, utilizes a more efficient mechanism for classifying connections and redirecting incoming and outgoing data. For example, as the service module 190 receives packets communicated between the wireless client 110 and the server 180, the packets may be directed through the IP filter and IP layers 322, 335 to the TCP layer 340 of the service module 190. For packets corresponding to connection establishment packets, such as SYN packets used in TCP/IP based protocols, the TCP layer 340 calls the classifier 325 to classify the connection establishment packets in accordance with a set of classification rules 330. If the connection establishment packets match a classification rule 330, the classifier 325 instructs the TCP layer 340 to terminate the connection with the source at the email compression application 250. The TCP layer 340 then modifies a TCP control block 342 to store the original packet header information received from the source, such as the original source and destination addresses and the original source and destination ports, and a redirected destination address and destination port associated with the email compression application 250. After the TCP layer 340 completes a three-way handshake with the original source, the operating system and networking stack 260 passes data to a client socket 360 and notifies the email compression application 250 that a new connection has been requested. Once the email compression application 250 accepts the new connection, the email compression application calls a socket API 352 that accesses the TCP control block 342 associated with the client socket 350 to retrieve the original packet header information. The email compression application 250 then opens a server socket 360 using the original destination address and destination port, and calls the socket API 352 to store the original packet header information, along with the redirected address and redirected port associated with the server socket 360, within a TCP control block 342 associated with the server socket 360.

For subsequent incoming packets corresponding to the same connection, the TCP layer 340 uses the TCP control block 342 to redirect incoming packets addressed from the source to the client socket 350 and to redirect incoming packets addressed from the destination to server socket 360. The email compression application 250 may then examine messages communicated between the source and destination by reading the client socket 350 and the server socket 360, and may send messages to the source and destination by writing data to the appropriate client socket 350 and server socket 360. For data written to the client socket 350, the data is passed to the TCP layer 340, which accesses the TCP control block 342 associated with the client socket 350 and generates packets having a source address and source port associated with the original destination. For data written to server socket 360, the TCP layer 340 similarly accesses the TCP control block 342 associated with the server socket 360 and generates packets having a source address and source port associated with the original source. It will be appreciated that the embodiment of FIG. 3B offers advantages over the embodiment of FIG. 3A in that classification only needs to be performed on connection establishment packets, and the modification of the TCP control block 342 associated with the client socket 350 and the server socket 360 enables the TCP layer 340 to redirect incoming packets to the appropriate client socket 350 or server socket 360 and to automatically generate outgoing packets having a source address and source port associated with the original end-to-end connection. As a result, the email compression application 250 may monitor messages communicated between the wireless client 110 and the server 180 and transparently compress email message data as described above.

It should be noted that the foregoing description of the embodiments of FIGS. 3A and 3B is presented to enable a person of ordinary skill in the art to make and use the invention. Additional functions and features associated with the classifier, classification rules and the interaction between the operating system and networking stack and user level applications are described in U.S. patent application Ser. No. 10/126,131, entitled “Systems and Methods for Providing Differentiated Services Within a Network Communication System”, which has published as U.S. Patent Publication No. 2003-0053448 A1, which has been assigned of record to the assignee of the present application and is incorporated herein by reference.

Figure 4:
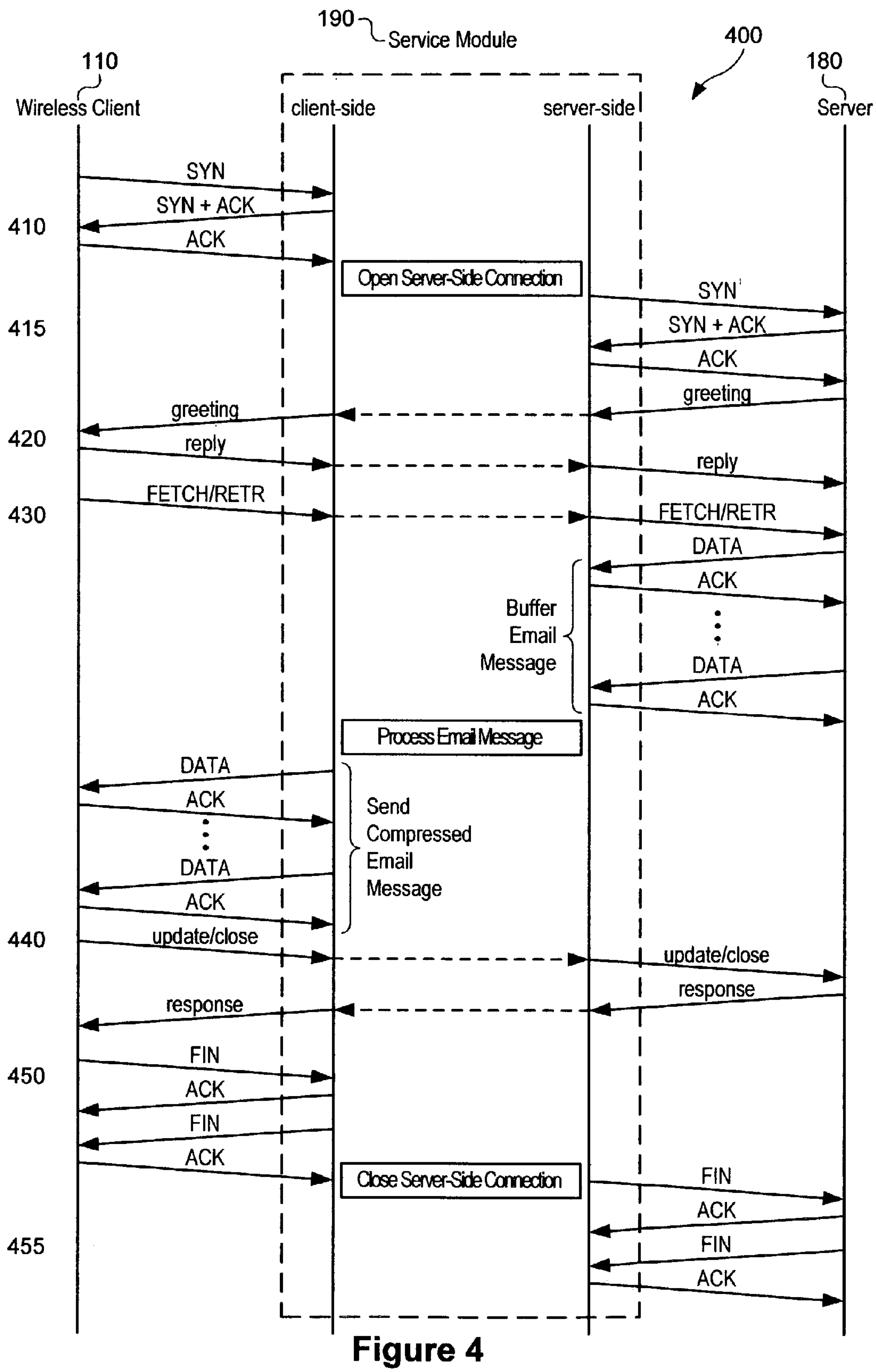
FIG. 4 illustrates a signal flow diagram showing exemplary signals passed between a wireless client, service module and server during an exemplary email session.

Referring to FIG. 4, a signal flow diagram showing exemplary signals passed between a wireless client, service module and server during an exemplary email session is illustrated generally at 400. As described above with respect to the embodiments of FIGS. 3A and 3B, packets communicated between the wireless client 110 and the server 180 may be intercepted by the service module 190 and redirected to an email compression application. As a result, the email compression application may be configured to monitor messages communicated between the wireless client 110 and the server 180 and to update the state of the email session. The email compression application may then process received messages in accordance with the current state of the email session. For example, the wireless client 110 may initiate an email session with the server 180 by attempting to engage in a three-way handshake with the server 180 as indicated generally at 410. During this connection establishment state, the service module 190 classifies the connection between the wireless client 110 and the server 180, and terminates the connection with the wireless client 110 at the email compression application. The operating system and networking stack of the service module 190 then completes the three-way handshake with the wireless client 110. Once the client-side connection is accepted by the email compression application, the email compression application opens a separate server-side connection with the server 180 using the original destination address and destination port. The operating system and networking stack of the service module 190 similarly completes a three-way handshake with the server 415 as indicated generally at 415. This process breaks the end-to-end connection between the wireless client 110 and the server 180 to form a client side-connection between the wireless client 110 and the service module 190 and a server-side connection between the service module 190 and the server 180.

Once the service module 190 completes the connection establishment state with the wireless client 110 and the server 180, the email session may then enter a user authentication state as indicated generally at 420. The messages communicated between the wireless client 110 and the server 180 during this state vary depending on the particular email protocol. Generally, the server 180 may send a greeting packet to the wireless client 110 requesting an appropriate user name and password, and the wireless client 110 responds by sending the requested information to the server 180. For these user authentication messages, the email compression application maintains end-to-end semantics by forwarding messages between the client-side connection and the server-side connection. This process may involve reading the message from the client-side connection and writing the message to the server-side connection and vice versa. Because the service module 190 uses the original source and destination address and source and destination ports for outgoing packets, the wireless client 110 and server 180 respond as though they are communicating with one another.

Once the user authentication state is complete, the email session may then enter a transaction state as indicated generally at 430. During this state the wireless client 110 may request retrieval of a particular email message as indicated by a FETCH (for an IMAP email protocol) or RETR (for a POP email protocol) command. The email compression application forwards this message to the server 180 by reading the message from the client-side connection and writing the message to the server-side connection. The email compression application then knows that the data received from the server 180 in response to the FETCH or RETR command will correspond to an email message. The email compression application then buffers the email message data received from the server 180. Furthermore, because the server-side connection is a separate connection, the operating system and networking stack of the service module 190 sends acknowledgement messages back to the server 180 in response to each received packet so that the server 180 will continue to send data corresponding to the email message. Once the entire message has been received (as indicated, for example, by receipt of the specified number of bytes set forth in the initial data packet), the email compression application strips the message headers and any protocol-specific data, compresses the data and attaches new message headers corresponding to the compressed email message. The compressed and reformatted email message is then sent to the wireless client 110 by writing the compressed email message to the client-side connection. Because the client-side connection is a separate connection, the operating system and networking stack of the service module 190 suppresses acknowledgement packet received from the wireless client 110 and retransmits lost packets without notifying the server 180.

After the email transaction state is complete, the email session may then enter into an update state (as indicated generally at 440) that closes the email session and a close state (as indicated generally at 450) that closes the connection between the wireless client 110 and the server 180. For messages communicated between the wireless client 110 and the server 180 during the update state, the email compression application maintains end-to-end semantics by forwarding messages between the client-side connection and the server-side connection. During the close state, however, the operating system and networking stack of the service module 190 responds to messages received by the wireless client 110 in order to close the client-side connection. The operating system and networking stack then notifies the email compression application that the client-side connection has been closed, and the email compression application responds by initiating closure of the server-side connection. The operating system and networking stack of the service module 190 then engages in conventional closure handshakes with the server 180 in order to close the server-side connection as indicated generally at 455.

Figure 5:
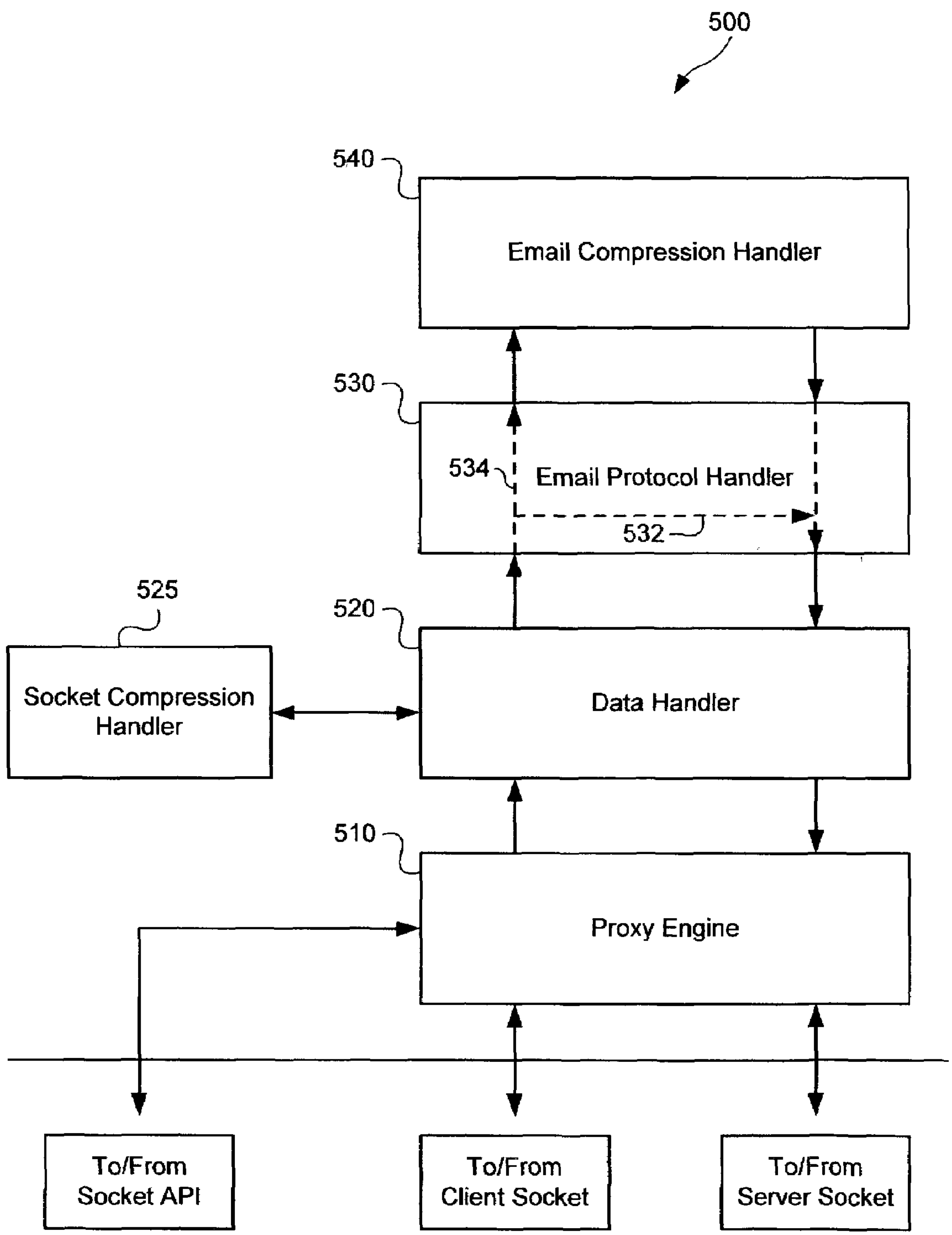
FIG. 5 illustrates a functional block diagram of an exemplary email compression application for processing email messages.

Referring to FIG. 5, a functional block diagram of an exemplary email compression application for processing email messages is illustrated generally at 500. The exemplary email compression application includes a proxy engine 510, a data handler 520, an email protocol handler 530 and an email compression handler 540. The proxy engine 510 acts as an interface between the data handler 520 and the operating system and networking stack and manages communication between the client socket and the server socket. During initial connection establishment stages, the proxy engine 510 interacts with the operating system and networking stack to break the connection between the wireless client and the server to form the client-side connection and the server-side connection. For example, the proxy engine 510 may monitor the available client sockets and accept new connection requests received from the operating system and networking stack. The proxy engine 510 may then request the original packet header information associated with the client socket from the socket API and open the server socket using the original destination address and destination port. The proxy engine 510 also calls the socket API to either create a new entry in the classification table or modify the TCP control block to store the connection information associated with the server socket. Once the client socket and the server socket have been established, the proxy engine 510 listens to the client socket and server socket for new messages. The proxy engine 510 then passes data received from the client socket and server socket to the data handler 520 and writes the data returned by the data handler 520 to the appropriate client socket or server socket.

Once the data handler 520 receives data from the proxy engine 510, the data handler 520 inspects the data to determine the corresponding handler that processes data of that type. For example, the proxy engine 510 may pass the source port from which the data was received to enable the data handler 520 to determine the applicable handler. Because the service module may associate each source port with a corresponding service (e.g., source port 4000 may correspond to POP and source port 4001 may correspond to socket compression), the data handler 520 may then determine the particular service associated with the data. If the source port associated with the data corresponds to an email service, the data handler 520 may then call the email protocol handler 530 to process the incoming data. On the other hand, if the service corresponds to a socket compression service, the data handler 520 forwards the incoming data to the socket handler 525. As a result, the service module may be configured to support two modes of compression, the socket compression performed by the socket handler 525 and the email compression performed by the email compression handler 540.

In order to support socket compression, however, the service module may need to determine whether the wireless client has a peer decompression unit for performing socket decompression. The service module may make this determination by adding a classification rule to the classifier that classifies incoming packets to determine whether the source address associated with a wireless client matches a predetermined source address or falls within a predetermined range of source addresses (which may comprise the source addresses of registered users of the peer decompression unit or designated subscribers of a network carrier who are issued a peer decompression unit). Alternatively, the service module may search a local or external database that stores the source addresses of registered users of a compatible socket decompression unit. If the source address of an incoming packet matches one or more of these classification rules or database entries, the service module may then redirect data to the socket handler 525 to perform socket compression and transmit the compressed socket to the wireless client in accordance with the above described principles.

If the data handler 520 passes the data to the email protocol handler 530, the email protocol handler 530 processes the data to perform the protocol-specific functions associated with managing the email session. For example, the email protocol handler 530 may be configured to monitor the data received from the data handler 520 and maintain a state machine for the email session. Based on the state of the email session, the data may take two paths through the email protocol handler 530 as indicated generally by paths 532 and 534. For data corresponding to connection establishment, user authentication and other protocol-specific messages, the email protocol handler 530 may update the state machine and pass the data back to the data handler 520, which forwards the data to the proxy engine 510. The proxy engine 510 then forwards the messages to the originally intended destination by writing the messages to the client socket or server socket. This transfer of data up to the email protocol handler 530 enables the email protocol handler 530 to monitor the state of the email session and detect initiation of an email message transaction. Conversely, the transfer of data down to the proxy engine 510 enables the proxy engine 510 to maintain the end-to-end semantics between the wireless client and the server. If the email protocol handler 530 detects the initiation of an email message transaction (e.g. the data was received in response to a FETCH or RETR command), the email protocol handler 530 buffers the email message data. Once the entire email message is received, the email protocol handler 530 extracts the email message by removing protocol specific data, such as POP byte-stuffing, to form a protocol independent RFC822 compliant email message. The email protocol handler 530 then passes the RFC822 compliant email message to the email compression handler 540.

Once the email compression handler 540 receives the email message, the email compression handler 540 parses the message header to determine the content type and encoding type. The email compression handler 540 may then decode the email message, compress the email message in accordance with the content type, encode the message and attach a new message header to match the newly formatted message body. As mentioned previously, the email compression handler 540 may utilize a compression format commonly incorporated within the operating system of wireless devices, such as the CAB format, so that the wireless client can decompress the email message and any associated attachments, without requiring special decompression modules (other than those already included within the operating system of the wireless device). The email compression handler 540 may also change the file extension associated with the compressed file to ".cab" to enable the operating system of the wireless client to automatically decompress the file in response to a user attempting to open the file. Once the email message is compressed, the email message handler 540 returns an RFC822 compliant message to the email protocol handler 540, which reformats the message with any protocol specific data, such as POP byte-stuffing. The resulting message is passed to the data handler 520 and proxy engine 510, where the compressed and reformatted email message is transmitted to the intended destination.

It should be noted that although the embodiment of FIG. 5 utilizes a single email compression application for handling multiple email protocols, additional embodiments are contemplated and embraced by the present invention. For example, in an alternative embodiment, the service module may include different email compression applications (with separate proxy engines, data handlers, email protocol handlers and email compression handlers) for each email protocol. In other words, the service module may include a first email compression application for handling the POP email protocol and a separate email compression application for handling the IMAP email protocol. The classifier may then be configured to redirect incoming email data streams to the destination port associated with appropriate email compression application, without requiring the data handler to determine the email protocol associated with the incoming data stream.

Figure 6:
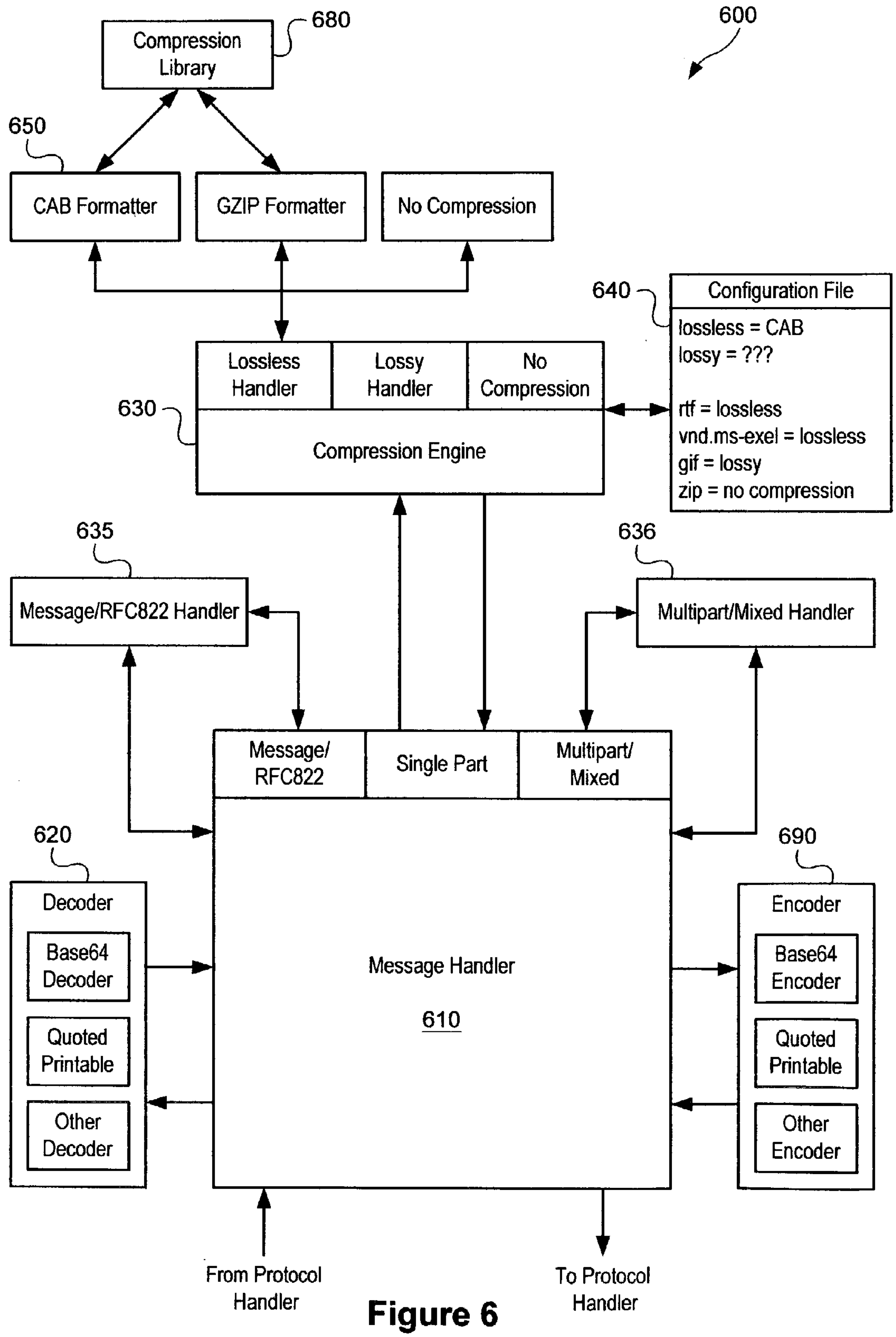
FIG. 6 illustrates a functional block diagram of an exemplary email compression handler in accordance with one embodiment of the present invention.

Referring to FIG. 6 a functional block diagram of an exemplary email compression handler in accordance with one embodiment of the present invention is illustrated generally at 600. As illustrated, a message handler 610 receives a protocol independent message from protocol handler. The message handler 610 may initially parse the message header of the received message to determine the content type, encoding type, data type and other information. The message handler 610 then passes the email message and the encoding type to a decoder 620, which decodes the email message in accordance with the encoding type. The decoder 620 may support the conventional encoding types used to encode email messages, such as Base64 and Quoted Printable. Based on the content type indicated in the message header, the message handler 610 will pass the decoded message to the compression engine 630, the multipart/mixed handler 636 or the message/RFC822 handler 635.

If the content type of the email message indicates that the email message is a simple or single part message (e.g., the message comprises a single file or body of text), the message handler 610 passes the email message to the compression engine 630. Because compression generally includes some overhead, the compression engine 630 may initially determine whether the size of the received email message exceeds a predetermined threshold. If the size falls below the threshold, the compression engine 630 passes the email message back to the message handler 610. Otherwise, the compression engine 630 proceeds with compression of the email message. In one embodiment of the present invention, the compression engine 630 may be configured to automatically pass the email message to the CAB formatter 650, which compresses the email message in accordance with a CAB format using the compression library 680 and passes the compressed email message back the compression engine 630. Alternatively, the compression engine 630 may be configured to compress email messages in accordance with the type of content. For example, the compression engine 630 may associate each type of content supported by an email protocol, such as "rtf", "vnd.ms-excel" and "gif", with a corresponding compression type, such as lossless compression, lossy compression or no compression. The association between the compression type and the type of content may be stored in a configuration file 640 that may be modified to register new types of content or change an existing association without requiring the email compression handler to be recompiled. The configuration file 640 may also associate each compression type with a compression format, such as a CAB format, a GZIP format or no compression, in order to enable a user via a management interface (illustrated in FIG. 2) to modify the compression format without modifying the association between the compression type and the type of content. For example, assuming the type of content associated with the email message equals "vnd.ms-exel", the compression engine 630 compresses the data using the CAB formatter 650 and passes the compressed data back to the message handler 610.

If the content type of the email message equals "message/RFC822" (indicating that the body of the email message includes an encapsulated message usually associated with a forwarded email), the message handler 610 passes the email message to a message/RFC822 handler 635, which separates the email message into its component messages and passes each message back to the message handler 610. The message handler 610 then decodes each message and compresses each message as though the message were a single part message. The message handler 610 then encodes the compressed message and passes each compressed message back to the message/RFC822 handler 635, which modifies the message header for each message to correspond to the compressed message (e.g., by changing the file name and file type parameters) and reassembles the compressed messages and modified message headers in the same order as the original uncompressed message. The message/RFC822 handler 635 then passes the reassembled message back to the message handler 610.

If the content type of the email message equals "multipart/mixed" (e.g., the email message has one or more attachments that may be of a different type of content), the message handler 610 passes the email message to a multipart/mixed handler 636, which extracts each part of the email message and passes each part back to the message handler 610. The message handler 610 then decodes each part and compresses each part as though the part were a separate (or stand-alone) message. The message handler 610 then encodes each compressed part and passes each compressed part back to the multipart/mixed handler 636, which modifies the message header for each part to correspond to the compressed part (e.g., by changing the file extension to an extension corresponding to the compression format, such ".cab") and reassembles the parts and modified message headers in the same order as the original uncompressed message. The multipart/mixed handler 636 then passes the reassembled message back to the message handler 610.

Once the message handler 610 receives the compressed messages from the compression engine 630, message/RFC822 handler 635 or multipart/mixed handler 636, the message handler 610 creates and attaches a new message header to match the newly formatted email message to form an RFC822 compliant email message. The message handler 610 then passes the compressed message back to the protocol handler, which reformats the message with any protocol specific data.

Figure 7A:
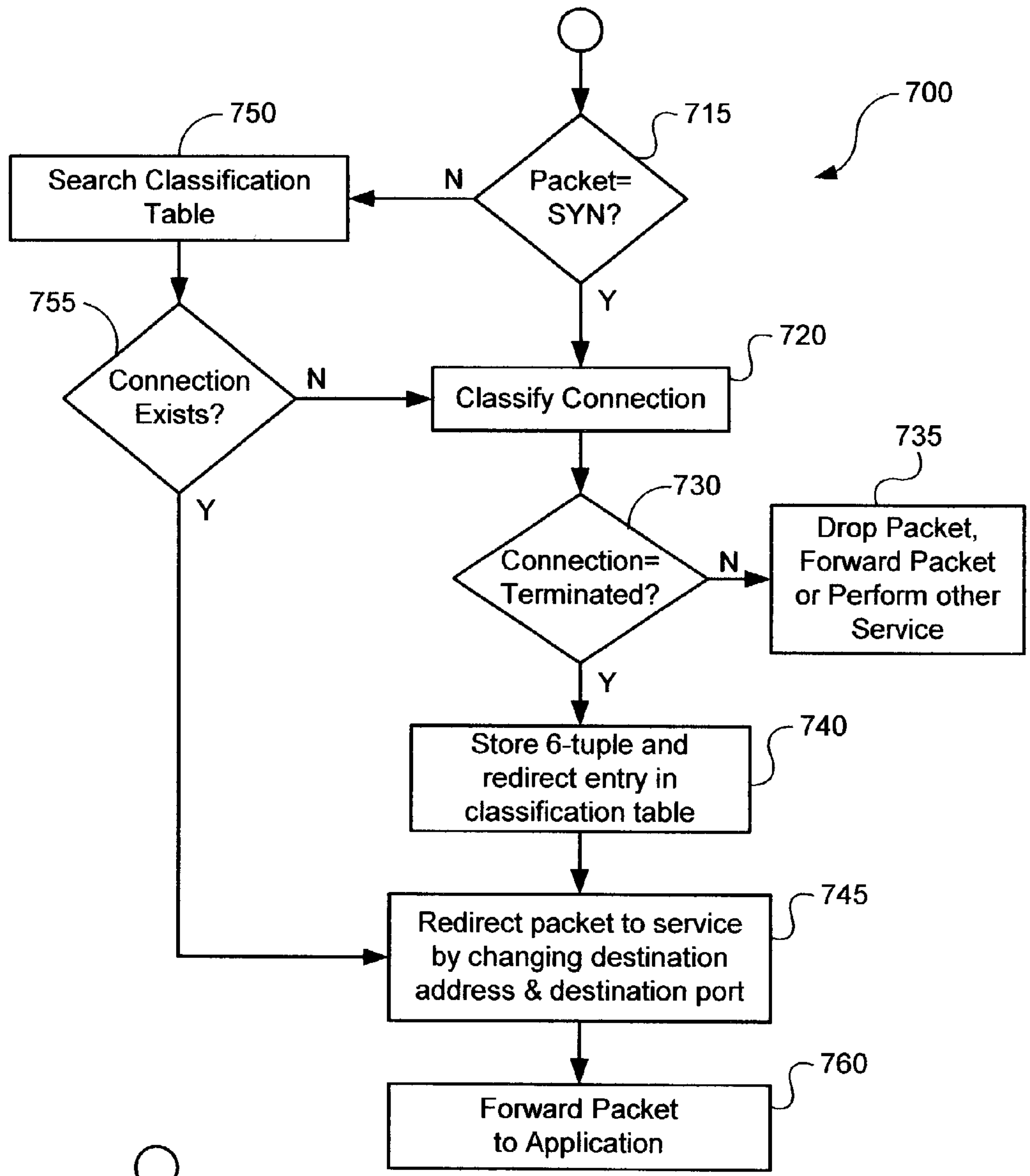
FIGS. 7A and 7B illustrate exemplary methods in flowchart form for redirecting received packets and reinserting packets into a data stream, respectively.

Referring to FIG. 7A, an exemplary method in flowchart form for classifying and redirecting received packets in accordance with one embodiment of the present invention is illustrated generally at 700. Once the exemplary method is initiated in response to an incoming packet, the exemplary method determines at step 715 whether the packet corresponds to a connection request packet, such as a SYN packet, indicating that the packet corresponds to a new connection that has not been previously classified. If the packet corresponds to a connection request packet, the exemplary method proceeds to step 720, where the packet is classified in accordance with one or more classification rules to determine whether the packet corresponds to an email service, such as POP or IMAP. The classification rules may comprise one or more masks that are applied to the packet header. Exemplary classification rules may mask the source address, source port, destination address, and device ID fields within the packet header and determine whether the protocol field equals TCP and whether the destination port equals either 110 (for POP email protocol) or 143 (for IMAP email protocol). Other exemplary classification rules may mask source port, destination address, destination port and device ID and protocol fields and determine whether the source address match a predetermined source address or falls within a range of source addresses. If the packet does not match a classification rule, the method does not terminate the packet, and either drops the packet, forwards the packet to the operating system and networking stack without modification, or performs other default services on the packet. If the packet matches a classification rule, the method stores the original packet header information and redirected destination address and destination port within the classification table at step 740, and redirects the packet to an email compression application associated with the service module at step 745 by replacing the original destination address and destination port with the redirected destination address and destination port associated with the classification rule. The modified packet is then forwarded through the operating system and networking stack of the service module to the email compression application at step 760.

Referring back to step 715, if the incoming packet does not correspond to a connection request packet, the method searches the classification table at step 750 to determine whether the packet corresponds to an on-going connection. This process may involve searching the classification table to determine whether the packet header of the incoming packet corresponds to an entry stored in the classification table. If so, the method proceeds to step 745 where the packet header is modified to replace the original destination address and destination port with the redirected destination address and destination port associated with the entry stored in the classification table. The modified packet is then forwarded through the operating system and networking stack of the service module to the email compression application at step 760. If the packet header of the incoming packet does not match an entry stored in the classification table at step 755, the method proceeds to step 720 to classify the packet in accordance with the above-described process.

Figure 7B:
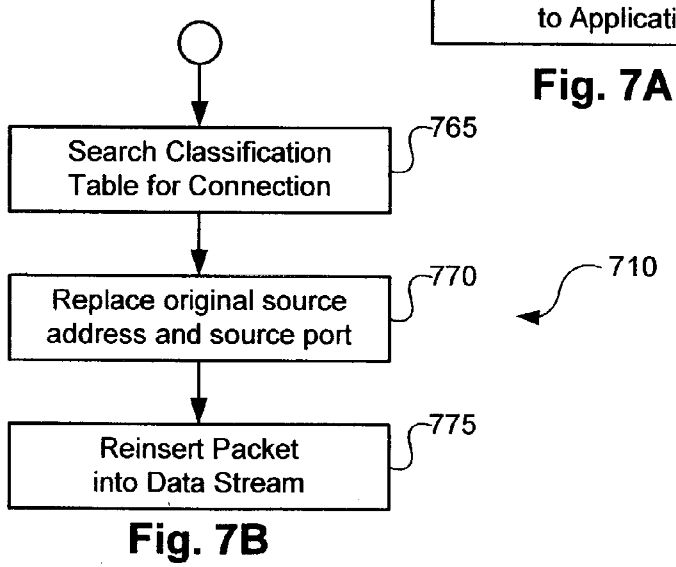

Referring to FIG. 7B, an exemplary method in flowchart form for reinserting packets into a data stream is illustrated generally at 710. Once the exemplary method is initiated in response to outgoing packets flowing through the operating system and network stack of the service module, the method searches the classification table at step 765 based on the packet header of the outgoing packet to determine the original source address associated with the end-to-end connection. The method then replaces the source address and source port of the outgoing packet with the original source address and source port at step 770. For example, for outgoing packets addressed to the server, the method would replace the source address and source port of the outgoing packet with the source address and source port associated with the wireless client. Conversely, for outgoing packets addressed to the client, the method would replace the source address and source port of the outgoing packet with the source address and source port associated with the server. Once the outgoing packet has been modified, the method then reinserts the modified outgoing packet into the data stream at step 775. The outgoing packet may then be routed through the communications network to the originally intended destination. Because the original source address and source ports are incorporated within the packet header, the destination will treat the packet as though the originated from the source. The foregoing process may be performed on all outgoing packets communicated to the source and destination so that the source and destination are unaware that the packets were processed by the server module.

Figure 8:
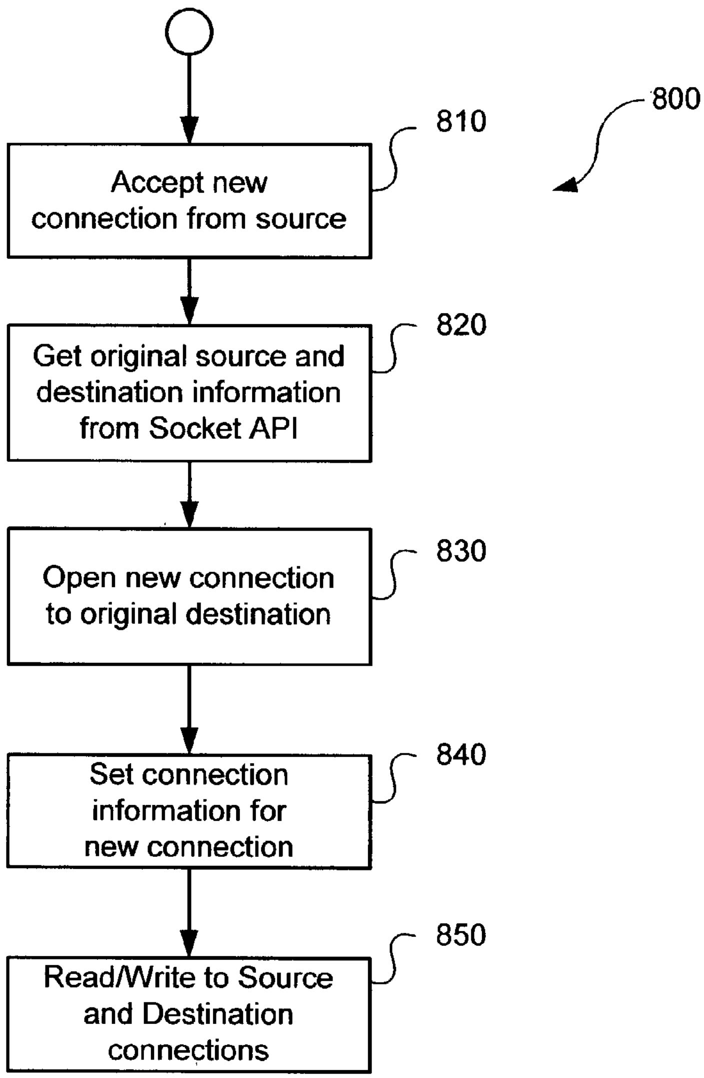
FIG. 8 illustrates an exemplary method in flowchart form for establishing a client side connection and a server-side connection.

Referring to FIG. 8, an exemplary method in flowchart form for establishing a client side connection and a server-side connection is illustrated generally at 800. The exemplary method of FIG. 8 may be performed by an email compression application in order to break a connection between the wireless client and the server by terminating the connection with the wireless client at the email compression application and opening a new connection between the email compression application and the server. The exemplary method may be initiated in response the operating system and networking stack setting a flag informing the email compression application that a new connection has been requested. At step 810, the method may accept the connection from the source (typically the client) to form a client-side connection between the email compression application and the source. The method then retrieves the original packet header information from the classification table at step 820 by calling an associated socket API to enable the email compression application to open a new connection to the original destination address and destination port at step 830 to form a server-side connection between the email compression application and the original destination. Furthermore, in order to enable the service module to redirect incoming packets to the email compression application on the server-side connection and replace the original source address and source port for outgoing packets, the method also calls the socket API to create a new entry within the classification table at step 840 that stores the connection information associated with the server-side connection. The email compression application may then read messages from and write messages to the source and destination connections at step 850.

Figure 9:
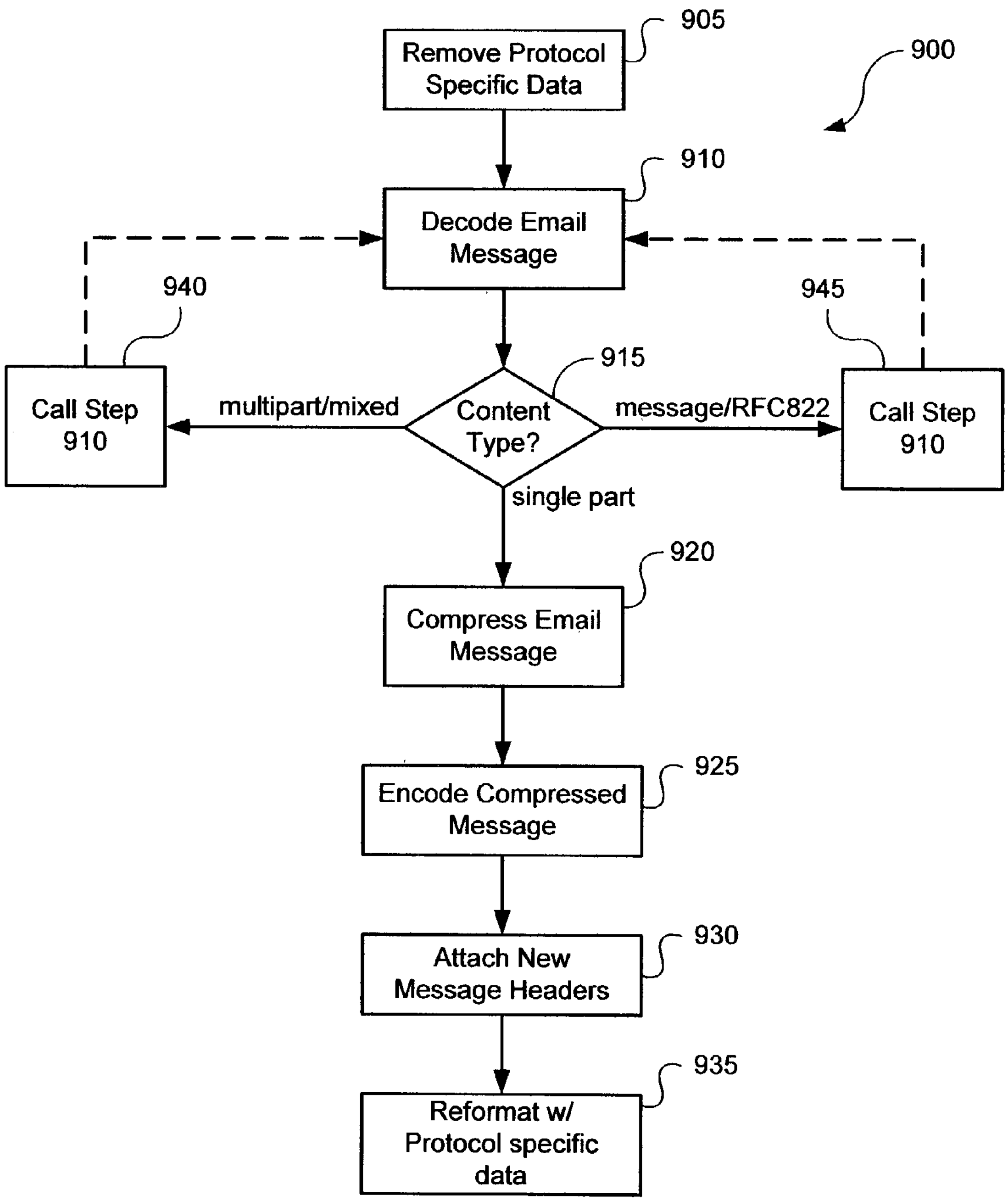
FIG. 9 illustrates an exemplary method in flowchart form for compressing received email messages in accordance with one embodiment of the present invention.

FIG. 9 illustrates an exemplary method in flowchart form for compressing received email messages in accordance with one embodiment of the present invention. The exemplary method of FIG. 9 may be performed by the email compression application once the entire email message has been received. As illustrated, the email compression application may initially extract the email message by removing protocol specific data, such as POP byte-stuffing, at step 905. After the email compression application reads the encoding type included in the message header, the email compression application decodes the message in accordance with the encoding type at step 910 to form a decoded email message. The email compression application then reads the message header to determine the content type at step 915 and compresses the email message in accordance with the content type. For example, email messages having a simple or single part content type (e.g., a single file or single body of text) may be initially examined to determine whether the size of the email message exceeds a predetermined threshold. If so, the email compression application compresses the single part email message at step 920 and encodes the compressed message at step 930. The email compression application then attaches new headers corresponding to the compressed and reformatted message at step 940, and reformats the message with any protocol specific data, such as POP byte-stuffing, at step 945.

Referring back to step 915, if the email message has a content type indicating multiple embedded parts (e.g., one or more email attachments), the email compression application extracts each part of the email message at step 940 and performs a function call to step 910 to process the extracted part as though the part were a separate message. Similarly, if the email message has a content type indicating multiple embedded messages (e.g., one or more forwarded email messages), the email compression application extracts each message at step 945 and performs a function call to step 910 to process the extracted message as though the message were a separate message. Each extracted part or extracted message is then decoded at step 910, and the content type of each extracted part or extracted message is determined at step 915. Depending on the content type, the email compression application will either compress the extracted part or extracted message as indicated above or perform another function call to step 910 in the event the extracted part or extracted message contains additional parts or messages. This recursive process enables each part of the message to be compressed and then reassembled in the same order as the original message.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

What is claimed is:

1. A method for compressing an email message communicated from a server to a client, the method comprising:

providing a compression module disposed between the server and the client for compressing at least a portion of the email message;

classifying a connection between the server and the client to determine whether the connection corresponds to an email service;

breaking the connection between the server and the client to form a first connection between the client and the compression module and a second connection between the compression module and the server in response to a determination that the connection corresponds to the email service;

receiving the email message from the server;

causing the compression module to compress at least a portion of the email message received from the server; and transmitting the compressed email message to the client.

2. The method of claim 1, wherein the step of classifying comprises comparing a destination port field of packets associated with the connection with a predetermined set of destination port numbers.

3. The method of claim 1, wherein the step of classifying comprises classifying packets associated with the connection in accordance with a set of classification rules.

4. The method of claim 3, wherein the set of classification rules comprise one or more masks applied to a packet header of the packets.

5. The method of claim 1, wherein the step of breaking comprises:

terminating the connection with the client at the compression module to form the first connection; and opening a separate connection between the compression module and the server to form the second connection.

6. The method of claim 1, wherein the step of breaking comprises redirecting packets communicated between the client and the server to the compression module by replacing a destination address and a destination port field of the packets with a destination address and destination port associated with the compression module.

7. The method of claim 1, further comprising forwarding protocol specific messages between the first connection and the second connection in an uncompressed format.

8. The method of claim 7, further comprising monitoring the protocol specific messages to detect initiation of an email transaction.

9. The method of claim 8, further comprising buffering email message data in response to detection of the email transaction.

10. The method of claim 1, further comprising generating outgoing packets communicated from the compression module using a source address and a source port associated with the end-to-end connection between the client and the server.

11. The method of claim 1, wherein the step of causing the compression module to compress comprises compressing the portion of the email message using a compression type natively supported by an operating system of the client.

12. The method of claim 1, wherein the step of causing the compression module to compress comprises compressing the portion of the email message using a compression type compatible with a decompression module incorporated in an operating system of the client in a default configuration.

13. The method of claim 12, wherein the decompression module is used by the operating system of the client to decompress operating system files during installation.

14. The method of claim 1, wherein the step of causing the compression module to compress comprises compressing the portion of the email message in a Cabinet format.

15. The method of claim 1, wherein the step of causing the compression module to compress comprises changing a file extension of at least a part of the compressed email message to ".cab".

16. The method of claim 1, wherein the email message includes one or more encapsulated parts, and wherein the step of causing the compression module to compress comprises the steps of:

extracting each of the one or more encapsulated parts;

compressing each of the encapsulated parts individually;

attaching message headers to each compressed part corresponding to the compressed data; and reassembling each compressed part in a same order as the uncompressed email message.

17. The method of claim 1, wherein the step of causing the compression module to compress comprises compressing the portion of the email message in accordance with a type of content associated with the email message.

18. The method of claim 17, further comprising storing an association between the type of content and a compression type in a file.

19. A method for performing service-based compression of an email message within a communications network, the communications network including a client having an operating system with a decompressor, the method comprising:

intercepting packets communicated between a client and a server, the packets containing data associated with an email session;

monitoring a state of the email session between the client and the server;

identifying transmission of the email message;

compressing at least a portion of the email message using a compression type compatible with the decompressor included in the operating system of the client; and transmitting the compressed email message to the client;

further comprising the step of breaking the connection between the server and the client to form a first connection between the client and a compression module and a second connection between the compression module and the server in response to a determination that the connection corresponds to the email session.

20. The method of claim 19, wherein the step of breaking comprises:

terminating the connection with the client at the compression module to form the first connection; and opening a separate connection between the compression module and the server to form the second connection.

21. The method of claim 19, wherein the step of breaking comprises redirecting the packets communicated between the client and the server to the compression module.

22. A system for compressing an email message communicated from a server to a client, the system comprising:

a processor; and a memory unit, operably coupled to the processor, for storing data and instructions which when executed by the processor cause the processor to operate so as to:

classify a connection between the server and the client to determine whether the connection corresponds to an email service;

break the connection between the server and the client to form a first connection between the client and a compression module and a second connection between the compression module and the server in response to a determination that the connection corresponds to the email service;

compress at least a portion of the email message received from the server; and transmit the compressed email message to the client.

* * * * *

UNITED STATES PATENT AND TRADEMARK OFFICE

CERTIFICATE OF CORRECTION

PATENT NO. : 7,024,460 B2 
APPLICATION NO. : 10/095551
DATED : April 4, 2006
INVENTOR(S) : Chris Koopmans, Constantine Polychronopoulos and Nicholas Stavrakos It is certified that error appears in the above-identified patent and that said Letters Patent is hereby corrected as shown below:

Page 1, the top line of the patent (item (12)), the inventor “Chris Koopmas” should be changed to --Chris Koopmans—

Page 1, the listing of inventors in (item (75)), the inventor “Chris Koopmas” should be changed to --Chris Koopmans—

Signed and Sealed this

Twenty-second Day of August, 2006

JON W. DUDAS
*Director of the United States Patent and Trademark Office*